(12) United States Patent
Uchiumi et al.

(10) Patent No.: US 7,473,735 B2
(45) Date of Patent: Jan. 6, 2009

(54) RESIN COMPOSITION AND METHOD FOR PRODUCING THE SAME

(75) Inventors: Naohiko Uchiumi, Okayama (JP); Kaoru Ikeda, Kurashiki (JP); Noriyuki Kida, Kurashiki (JP); Tetsuya Hara, Kurashiki (JP); Syukiti Kawamura, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 476 days.

(21) Appl. No.: 10/896,091

(22) Filed: Jul. 22, 2004

(65) Prior Publication Data

US 2005/0027053 A1  Feb. 3, 2005

(30) Foreign Application Priority Data

Aug. 1, 2003 (JP) ............................. 2003-284764
Aug. 7, 2003 (JP) ............................. 2003-288901
Aug. 7, 2003 (JP) ............................. 2003-289149

(51) Int. Cl.
*C08F 16/06* (2006.01)
*C08L 77/00* (2006.01)

(52) U.S. Cl. ................. 525/60; 524/402; 524/404; 524/414; 525/57; 525/78; 525/217; 525/218; 525/221; 525/222

(58) Field of Classification Search ............ 525/57, 525/60, 78, 217, 218, 221, 222; 524/402, 524/404, 414
See application file for complete search history.

(56) References Cited

U.S. PATENT DOCUMENTS

| | | | |
|---|---|---|---|
| 3,975,463 A | 8/1976 | Hirata et al. | |
| 4,795,781 A | 1/1989 | Miyamoto et al. | |
| 5,338,502 A | 8/1994 | Moriyama et al. | |
| 6,174,949 B1 | 1/2001 | Ninomiya et al. | |
| 6,485,842 B1 | 11/2002 | Shindome et al. | |
| 6,953,827 B2 * | 10/2005 | Hara et al. | ............... 525/58 |

FOREIGN PATENT DOCUMENTS

| | | |
|---|---|---|
| CA | 2 472 783 A1 | 8/2003 |
| CN | 1281004 A | 1/2001 |
| EP | 0842978 A | 5/1998 |
| EP | 1 090 953 | 4/2001 |
| EP | 1108744 * | 6/2001 |
| EP | 1 184 418 A1 | 3/2002 |
| EP | 1 403 289 | 3/2004 |
| JP | 4-114060 | 4/1992 |
| JP | 4-178447 | 6/1992 |
| JP | 5-140386 | 6/1993 |
| JP | 8-259756 | 10/1996 |
| JP | 10-204229 A | 8/1998 |
| WO | 01/96464 A | 12/2001 |

* cited by examiner

*Primary Examiner*—Ana L. Woodward
(74) *Attorney, Agent, or Firm*—Oblon, Spivak, McClelland, Maier & Neustadt, P.C.

(57) ABSTRACT

The present invention provides a resin composition which comprises EVOH and a thermoplastic resin other than EVOH and which generates less odor and therefore is suitable for food packaging applications. The invention also provides an environmentally friendly method for producing a resin composition, without releasing any carboxylic acid such as acetic acid to the peripheral environment. A resin composition containing less carboxylate group is obtained by contacting an ethylene-vinyl alcohol copolymer resin with an aqueous solution containing both carbon dioxide gas and at least one additive selected from the group consisting of an alkali metal salt (A) and a boron compound (B) and then melt kneading with a thermoplastic resin (G) other than EVOH.

22 Claims, 2 Drawing Sheets

RESIN COMPOSITION AND METHOD FOR PRODUCING THE SAME

BACKGROUND OF THE INVENTION

1. Field of the Invention

The present invention relates to resin compositions comprising an ethylene-vinyl alcohol copolymer and a thermoplastic resin other than ethylene-vinyl alcohol copolymers and to methods for producing the same.

2. Description of the Related Art

Ethylene-vinyl alcohol copolymer, which may henceforth be abbreviated as EVOH, is a useful macromolecular material superior in oxygen barrier property, oil resistance, antistatic property and mechanical strength and is in wide use as various types of packaging materials such as films, sheets and containers. Although EVOH pellets are molded into various molded articles by various methods, they are often melt-molded by, for example, extrusion molding or injection molding. However, in general, when molding an EVOH resin, it is necessary to set the melting temperature to be 200° C. or higher. Therefore, EVOH containing no additives is liable to deteriorate when being melt molded and it accordingly may cause deterioration in product quality due to formation of fish eyes or hard spots in products. In addition, it is necessary to add some additives in order also to improve the interlayer adhesiveness when using it with other resins while laminating them.

In a pamphlet of WO 99/05213 (U.S. Pat. No. 6,174,949), disclosed is an EVOH resin composition containing a boron compound as an essential component, acetic acid as an optional component, and at least one compound as an essential component selected from among an acetic acid salt and a phosphoric acid compound, the content of each component based on 100 parts by weight of EVOH being 0.001 to 1 part by weight in terms of boron for the boron compound, 0 to 0.05 part by weight for acetic acid, 0.001 to 0.05 part by weight in terms of metal for the acetic acid salt, and 0.0005 to 0.05 part by weight in terms of phosphate group for the phosphoric acid compound. This resin composition is reported to be an EVOH resin composition having been improved in long-run workability, appearance and interlayer adhesiveness. The publication discloses that the purpose of the incorporation of the acetic acid salt is to improve the long-run workability or the interlayer adhesiveness.

JP-A-164059/2001 (EP-A-1090953) discloses an EVOH resin composition which is characterized in that, when it is heated to melt, its MFR shows specific behavior and that it contains from 50 to 500 ppm of carboxylic acid having a molecular weight of less than 75, from 50 to 500 ppm, in terms of metal element, of an alkali metal salt, from 10 to 120 ppm, in terms of metal element, of an alkaline earth metal salt, from 10 to 200 ppm, in terms of phosphate group, of a phosphoric acid compound and from 50 to 2000 ppm, in terms of boron element, of a boron compound. This resin composition is reported to be an EVOH resin composition which is superior in appearance and in long-run workability at the time of its melt molding, less suffers yellowing when being recovered, and shows a superior interlayer adhesiveness when being fabricated into a laminate. In this invention, the alkali metal salt and the boron compound are added for improving the interlayer adhesiveness and for improving the long-run workability, respectively.

As a typical method for producing pellets of an EVOH resin composition containing the additives, a method in which hydrous EVOH pellets are contacted with an aqueous solution containing the additives is disclosed. According to this method, it is easy to control the amounts of minor components contained in the EVOH resin composition pellets through an adjustment of the solution concentration and, therefore, it is possible to obtain pellets of stable quality by contacting them with the aqueous solution and then drying.

As mentioned above, the addition of an alkali metal salt to EVOH in order to improve the interlayer adhesiveness has been done conventionally. The alkali metal salt is added typically in the form of an acetic acid salt. In many cases, acetic acid, which is not in the form of a salt, is also added simultaneously. Such an EVOH resin composition containing an acetate group, however, may emit an acetic acid smell. One of the main applications of EVOH resin compositions is food packaging containers. In the market, EVOH resin compositions emitting smell as less as possible have been sought. In addition, EVOH resin compositions having a more improved melt stability and a superior long-run workability have been awaited.

On the other hand, in many cases where EVOH resin composition pellets are produced by contacting hydrous EVOH pellets with an aqueous solution containing acetic acid or its salt, acetic acid is released to the atmosphere when the hydrous pellets resulting from the contact are dried. Therefore, the surrounding environment and the working environment may be adversely affected.

A resin composition comprising an EVOH and a thermoplastic resin other than EVOHs are in wide use for improving the gas barrier property of the thermoplastic resin or for improving the flexibility, stretchability and flexing resistance of the EVOH as described below. In conventional production of such a resin composition, a method has been used in which a resin composition comprising an EVOH resin composition which was made contain additives by the method mentioned above is melt kneaded with a thermoplastic resin (G) other than EVOHs. Therefore, the problems with the above-mentioned conventional EVOH resin compositions have been left unsolved.

For example, resin compositions comprising EVOH and polyolefin are used widely for improving the gas barrier property of polyolefin or improving the flexibility of EVOH.

In addition, resin compositions comprising EVOH and polyamide are used widely for improving the gas barrier property of polyamide or for improving the flexibility of EVOH. For these purposes, use of a polyamide having a regulated amount of terminal amino groups as the polyamide is believed desirable. As resin compositions of a polyamide having a regulated amount of terminal amino groups and EVOH, various types of resin compositions have been proposed.

For example, there are known a technology of improving the melt moldability by use of a composition comprising an EVOH and a polyamide modified with monoamine compounds at its terminal carboxyl group (see, for example, JP-B-5-1819/U.S. Pat. No. 4,795,781) and a technology of improving the hot water resistance, the stretchability, and the like by use of a composition comprising an EVOH and a polyamide copolymer made up mainly of caproamide wherein the amount of terminal amino groups is regulated to be less than the amount of terminal carboxyl groups using a terminal regulating agent (see, for example, JP-A-4-178447). In addition, there have also been proposed a technology of improving the heat stability during melt molding by blending an EVOH with a polyamide whose terminal amino groups are modified to 30 µeq/g with acid anhydride, carboxylic acid and carboxylate (see, for example, JP-A-5-140386 and JP-A-4-114060), and a technology of improving the form retainability during or after retort sterilization in the case of forming a film or a multilayer packaging material by blending an EVOH with a polyamide modified with a diamine compound and a carboxylic acid (see, for example, JP-A-8-259756).

EVOH is superior in transparency and gas barrier property, but it has drawbacks of being poor in stretchability, flexibility and flexing resistance. Known is a method of blending a flexible resin such as an ethylene-vinyl acetate copolymer and an ethylene-propylene copolymer to an EVOH to improve the defect. However, this method has a defect that transparency deteriorates greatly. As a substitute for these flexible resins, a pamphlet of WO02/092643 (EP-A-1403289) discloses a modified EVOH having an ethylene content of 5 to 55 mol % and containing 0.3 to 40 mol % of the following structural unit (I). This modified EVOH is superior in barrier property, transparency, stretchability, flexibility and flexing resistance and is used in the form of a mono- or multi-layer structure for various types of molded articles. The pamphlet discloses that the modified EVOH can also be used, for example, for coinjection blow molded containers, thermoformed articles and drawn film. It also discloses that that other resins or various types of filler may be blended with the modified EVOH.

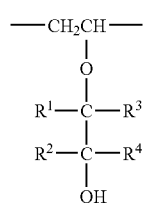

(I)

wherein $R^1$, $R^2$, $R^3$ and $R^4$ each denote a hydrogen atom, an aliphatic hydrocarbon group having 1 to 10 carbon atoms, an alicyclic hydrocarbon group having 3 to 10 carbon atoms or an aromatic hydrocarbon group having 6 to 10 carbon atoms; $R^1$, $R^2$, $R^3$ and $R^4$ may be the same group or may differ from each other; $R^3$ and $R^4$ may be combined together; and $R^1$, $R^2$, $R^3$ and $R^4$ each may have a hydroxyl group, a carboxyl group or a halogen atom.

SUMMARY OF THE INVENTION

The present invention was created for solving the above-mentioned problems. An object of the present invention is to provide a resin composition comprising an EVOH resin composition and a thermoplastic resin other than EVOH, the resin composition generating less odor and therefore being suitable for food packaging applications and so on. Another object of the invention is preferably to provide a resin composition having an improved melt stability and being superior also in long-run workability. Still another object of the present invention is to provide a method for producing a resin composition comprising an EVOH resin composition and a thermoplastic resin other than EVOH, the method being environmentally friendly and releasing no carboxylic acid such as acetic acid to the peripheral environment.

The above-mentioned objects can be achieved by providing a resin composition comprising: an ethylene-vinyl alcohol copolymer resin composition (F) that contains 0.1 to 20 µmol/g, in terms of alkali metal, of an alkali metal salt (A), 0 to 2 µmol/g of a carboxylate group (C1) which is extracted through an immersion treatment in water at 95° C. for 10 hours, and 0 to 40 µmol/g of a carboxylate group (C2) which is extracted through an immersion treatment in a 0.05 N aqueous sodium hydroxide solution at 95° C. for 10 hours, and a thermoplastic resin (G) other than ethylene-vinyl alcohol copolymers.

The above-mentioned objects can be achieved also by providing a resin composition comprising: an ethylene-vinyl alcohol copolymer resin composition (F) that contains 0.1 to 20 µmol/g, in terms of alkali metal, of an alkali metal salt (A) and 0 to 2 µmol/g of a carboxylate group (C1) which is extracted through an immersion treatment in water at 95° C. for 10 hours and that has a degree of saponification of 99.7 to 100 mol %, and a thermoplastic resin (G) other than ethylene-vinyl alcohol copolymers.

In these resin compositions, it is preferable that the thermoplastic resin (G) be at least one resin selected from the group consisting of polyolefin (G1), polyamide (G2) and a modified ethylene-vinyl alcohol copolymer (G3) having an ethylene content of 5 to 55 mol % and containing 0.3 to 40 mol % of the following structural unit (I). In such a situation, a resin composition comprising 0.1 to 99.9% by weight of the ethylene-vinyl alcohol copolymer resin composition (F) and 0.1 to 99.9% by weight of the polyolefin (G1) is one preferred embodiment. A resin composition comprising 1 to 99% by weight of the ethylene-vinyl alcohol copolymer resin composition (F) and 1 to 99% by weight of the polyamide (G2) is another preferred embodiment. In such a situation, it is preferable that the polyamide (G2) have terminal amino groups in an amount of 15 µeq/g or less. A resin composition comprising 1 to 99% by weight of the ethylene-vinyl alcohol copolymer resin composition (F) and 1 to 99% by weight of the modified ethylene-vinyl alcohol copolymer (G3) is another preferred embodiment.

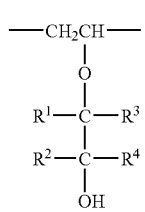

(I)

wherein $R^1$, $R^2$, $R^3$ and $R^4$ each denote a hydrogen atom, an aliphatic hydrocarbon group having 1 to 10 carbon atoms, an alicyclic hydrocarbon group having 3 to 10 carbon atoms or an aromatic hydrocarbon group having 6 to 10 carbon atoms; $R^1$, $R^2$, $R^3$ and $R^4$ may be the same group or may differ from each other; $R^3$ and $R^4$ may be combined together; and $R^1$, $R^2$, $R^3$ and $R^4$ each may have a hydroxyl group, a carboxyl group or a halogen atom.

In these resin compositions, it is also preferable that the alkali metal salt (A) be a potassium salt. It is also preferable that the ethylene-vinyl alcohol copolymer resin composition (F) further contains 1 to 200 µmol/g, in terms of boron element, of a boron compound (B). In addition, it is also preferable that the phosphorus element content (t) of the ethylene-vinyl alcohol copolymer resin composition (F) be 0.05 to 5 µmol/g. Moreover, molded articles obtained by molding the above-mentioned resin compositions are preferred embodiments of the present invention.

The above-mentioned objects can be further achieved by providing a method for producing a resin composition, wherein an ethylene-vinyl alcohol copolymer resin is contacted with an aqueous solution containing both carbon dioxide gas and at least one additive selected from the group consisting of an alkali metal salt (A) and a boron compound (B) and then is melt kneaded with a thermoplastic resin (G) other than ethylene-vinyl alcohol copolymers.

In these resin compositions, it is a preferred embodiment that the thermoplastic (G) is a polyolefin (G1). In another preferred embodiment, the thermoplastic (G) is polyamide (G2). In still another preferred embodiment, the thermoplastic (G) is a modified ethylene-vinyl alcohol copolymer (G3) having an ethylene content of 5 to 55 mol % and containing 0.3 to 40 mol % of the following structural unit (I):

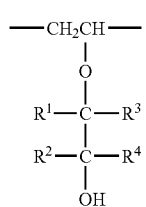

wherein $R^1$, $R^2$, $R^3$ and $R^4$ each denote a hydrogen atom, an aliphatic hydrocarbon group having 1 to 10 carbon atoms, an alicyclic hydrocarbon group having 3 to 10 carbon atoms or an aromatic hydrocarbon group having 6 to 10 carbon atoms; $R^1$, $R^2$, $R^3$ and $R^4$ may be the same group or may differ from each other; $R^3$ and $R^4$ may be combined together; and $R^1$, $R^2$, $R^3$ and $R^4$ each may have a hydroxyl group, a carboxyl group or a halogen atom.

The resin composition of the present invention generates less odor and therefore is suitable for food packaging applications and so on. It is also superior in melt stability and long-run workability. The method for producing a resin composition of the present invention is an environmentally friendly method which releases no carboxylic acid such as acetic acid to the peripheral environment.

DETAILED DESCRIPTION OF THE PREFERRED EMBODIMENTS

Figure 1:
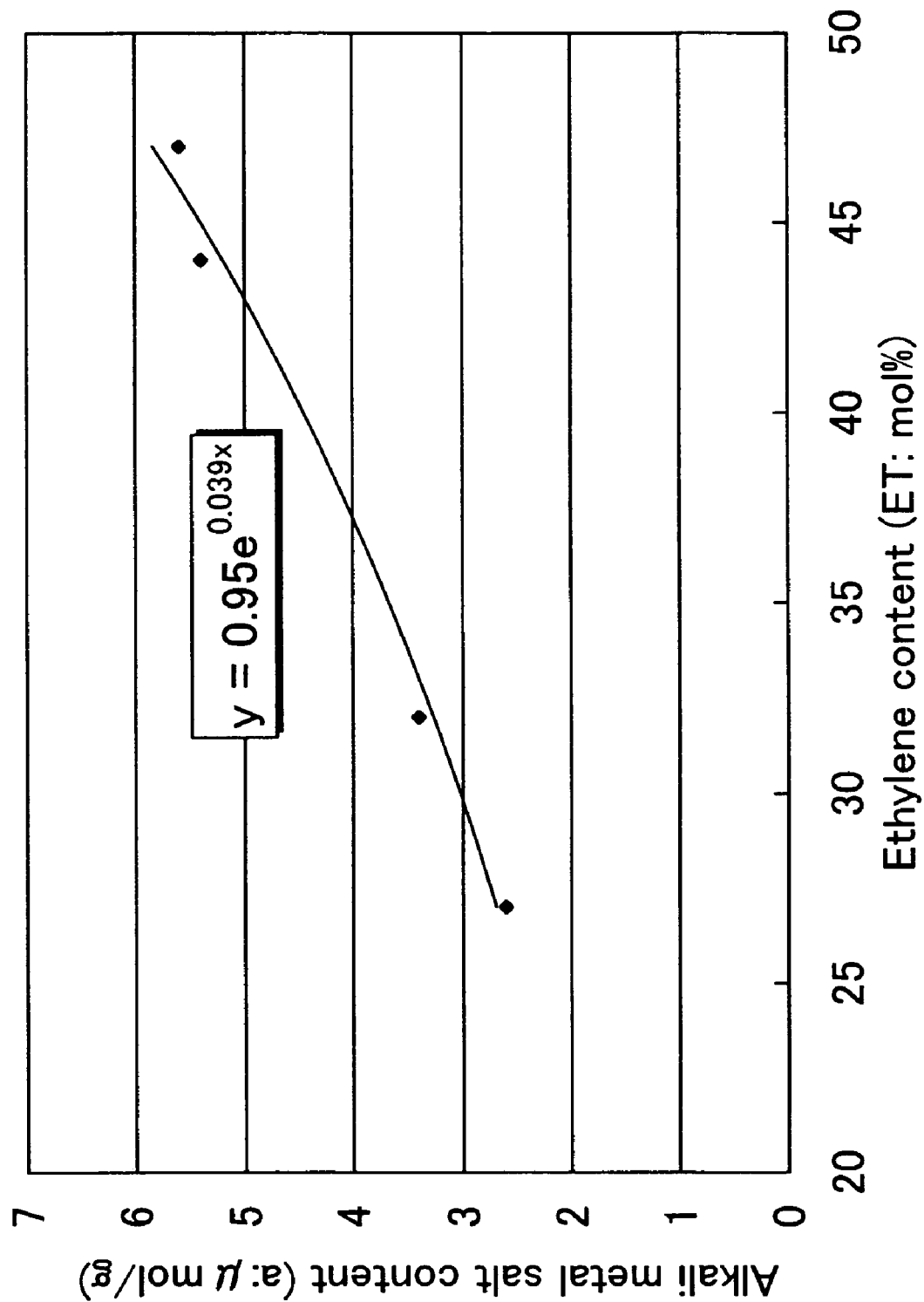
FIG. 1 is a graph showing the relation between the ethylene content (ET) and the content (a) of alkali metal salt (A) in Examples 1 to 3 and Referential Examples 7 and 8.

First, the method for producing the EVOH resin composition (F) for use in the present invention is described. A preferable method is a production method comprising contacting an ethylene-vinyl alcohol copolymer resin with an aqueous solution containing both carbon dioxide gas and at least one additive selected from the group consisting of an alkali metal salt (A) and a boron compound (B).

To make EVOH resin contain at least one additive selected from the group consisting of an alkali metal salt (A) and a boron compound (B), conventionally employed is a method in which an EVOH is brought into contact with an aqueous solution containing these additives. The EVOH resin composition (F) for use in the present invention is characterized in that an EVOH is contacted with an aqueous solution containing carbon dioxide gas as well as the additives.

In order to improve the interlayer adhesiveness in a multilayer structure containing a layer of the resin composition comprising the EVOH resin composition (F) and the thermoplastic resin (G) other than EVOH, it is desirable that the EVOH resin composition (F) contain an alkali metal salt (A). Therefore, an EVOH resin is, in many cases, immersed in an aqueous solution containing the alkali metal salt (A), especially an acetic acid salt of alkali metal. If, however, the solution used for the immersion is alkaline, the stability at the time of melt molding often deteriorates. For eliminating this problem, an acid, especially a carboxylic acid typified by acetic acid, is further added in many cases.

However, if the content of carboxylate group derived from carboxylic acid or its salt is large, a resulting EVOH resin composition will often generate a carboxylic acid odor and may cause problems when being used for a food packaging application. In addition, there also is a problem in that a carboxylic acid is released during the drying conducted after the contact with the aqueous solution containing the additives. A method therefore has been awaited in which the alkali metal salt (A) is contained and a carboxylate group is contained in a minimized amount but an aqueous solution containing additives is not made alkaline. The EVOH resin composition (F) for use in the present invention can solve this problem by making the aqueous solution containing the alkali metal salt (A) contain carbon dioxide gas instead using acetic acid.

For improving the long-run workability when melt molding a resin composition comprising the EVOH resin composition (F) and the thermoplastic resin (G), it is desirable to add a boron compound (B) to the EVOH resin. Therefore, in many cases, EVOH resin is immersed in an aqueous solution containing a boron compound(B). However, even if a boron compound (B) is contained, the long-run workability may still be insufficient for some applications. Further improvements are therefore awaited.

Causing the aqueous solution containing a boron compound (B) to contain carbon dioxide gas will make it possible to further improve the EVOH resin composition (F) used in the present invention. In other words, the reduction in content of the carboxylate group through use of an aqueous solution containing carbon dioxide gas instead of use of acetic acid and the addition of the boron compound (B) enable an EVOH resin composition (F) superior in long-run workability to be obtained. In addition, it becomes possible to obtain a resin composition superior in long-run workability which comprises the EVOH resin composition (F) and the thermoplastic resin (G).

The EVOH for use in the present invention is preferably one obtained by saponifying an ethylene-vinyl ester copolymer. Particularly preferred is one obtained by saponifying an ethylene-vinyl acetate copolymer. For obtaining a molded article superior in both gas barrier properties and melt moldability, the ethylene content of the EVOH is preferably from 5 to 60 mol %. If the ethylene content is less than 5 mol %, the melt moldability may be worse. If it exceeds 60 mol %, the gas barrier properties may be insufficient. The lower limit of the ethylene content is preferably 15 mol % or more, and more preferably 20 mo % or more. On the other hand, the upper limit of the ethylene content is preferably 55 mol % or less, and more preferably 50 mol % or less.

The degree of saponification of vinyl acetate moieties is preferably 80 to 100 mol %. For obtaining a molded article superior in gas barrier properties, the degree of saponification is more preferably 95 mol % or more, still more preferably 98 mol % or more, and particularly preferably 99 mol % or more. If the degree of saponification is less than 80 mol %, the barrier properties, the long-run workability and the moisture resistance may be worse. In the case of producing an EVOH composition superior particularly in melt stability and also superior in long-run workability, the degree of saponification of the EVOH is preferably 99.7 mol % or more, more preferably 99.8 mol % or more, still more preferably 99.9 mol % or more, and particularly preferably 99.95 mol % or more.

During the copolymerization of ethylene and vinyl acetate, other vinyl esters of fatty acids (e.g., vinyl propionate, vinyl pivalate, etc.) may be used together. The EVOH may contain from 0.0002 to 0.2 mol % of a vinylsilane compound as a comonomer. The vinylsilane compounds include, for example, vinyltrimethoxysilane, vinyltriethoxysilane, vinyltri(β-methoxy-ethoxy)silane and γ-methacryloxypropylmethoxysilane. Of these, vinyltrimethoxysilane and vinyltriethoxysilane are suitably employed.

The method of producing the EVOH for use in the invention is described below concretely. The polymerization of ethylene and vinyl acetate is not restricted to solution polymerization and may be any of solution polymerization, suspension polymerization, emulsion polymerization and bulk polymerization. These may be conducted either in continuous mode and in batch mode. The polymerization conditions used in solution polymerization are as follows.

Solvent: Alcohols are preferred, but any other organic solvents (e.g., dimethylsulfoxide) capable of dissolving ethylene, vinyl acetate and ethylene-vinyl acetate copolymers may also be used. Alcohols usable herein include methyl alcohol, ethyl alcohol, propyl alcohol, n-butyl alcohol and t-butyl alcohol. Especially preferred is methyl alcohol.

Catalyst: Usable are azonitrile-type initiators such as 2,2-azobisisobutyronitrile,
2,2-azobis-(2,4-dimethylvaleronitrile),
2,2-azobis-(4-methyl-2,4-dimethylvaleronitrile),
2,2-azobis-(4-methoxy-2,4-dimethylvaleronitrile), and
2,2-azobis-(2-cyclopropylpropionitrile); organic peroxide-type initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide and t-butyl hydroperoxide.

Temperature: 20 to 90° C., preferably 40° C. to 70° C.

Time (average residence time in the case of continuous mode): 2 to 15 hours, preferably 3 to 11 hours.

Degree of polymerization: 10 to 90%, preferably 30 to 80% based on the vinyl ester fed into the reactor.

Resin content of the solution after polymerization: 5 to 85%, preferably 20 to 70%.

Ethylene content in copolymers: Preferably 5 to 60 mol %, more preferably 15 to 55 mol %, even most preferably 20 to 50 mol %.

In addition to ethylene and vinyl acetate, any other minor comonomers capable of copolymerizing with them may be present. The comonomers include, for example, α-olefins such as propylene, isobutylene, α-octene and α-dodecene; unsaturated acids such as acrylic acid, methacrylic acid, crotonic acid, maleic acid and itaconic acid; and their anhydrides, salts, or mono- or di-alkyl esters; nitriles such as acrylonitrile and methacrylonitrile; amides such as acrylamide and methacrylamide; olefinsulfonic acids such as ethylenesulfonic acid, allylsulfonic acid and methallylsulfonic acid; and their salts; alkyl vinyl ethers, vinyl ketones, N-vinylpyrrolidone, vinyl chloride and vinylidene chloride.

After the monomers have been polymerized for a predetermined period of time to give the intended copolymer having a predetermined degree of polymerization, a polymerization inhibitor may be added thereto, if desired. Then, the non-reacted ethylene gas is evaporated away, and the non-reacted vinyl acetate is purged away. To purge the non-reacted vinyl acetate from the ethylene-vinyl acetate copolymer solution after the removal of ethylene by evaporation, for example, the copolymer solution is continuously fed into a column filled with raschig rings at its higher part at a constant flow rate while a vapor of an organic solvent such as methanol or the like is jetted into the column at its lower part, whereby a mixed vapor of the organic solvent such as methanol or the like and the unreacted vinyl acetate is let out from the column through its top, and the copolymer solution from which the unreacted vinyl acetate has been removed is taken out of the column through its bottom.

An alkali catalyst is added to the copolymer solution from which the unreacted vinyl acetate has been removed, whereby the vinyl acetate moiety of the copolymer is saponified. For this, employable is any of continuous or batchwise saponification. The alkali catalyst includes, for example, sodium hydroxide, potassium hydroxide and alkali metal alcoholates. The solvent for use in the saponification is preferably methanol. For example, the conditions for saponification are as follow:

Concentration of copolymer solution: 10 to 50%.
Reaction temperature: 30 to 150° C.
Amount of catalyst to be used: 0.005 to 0.6 equivalent (based on the vinyl acetate moiety).
Time (average residence time in the case of continuous mode): 10 minutes to 6 hours.

Generally, in continuous saponification, a resin with a higher degree of saponification can be obtained by use of a catalyst in an amount less than that used in batchwise saponification because in continuous saponification the methyl acetate resulting from the saponification can be removed more efficiently. Continuous saponification must be carried out at higher temperatures for the purpose of preventing EVOH formed in the saponification from forming crystals. In continuous saponification, therefore, it is preferable to use a reaction temperature and an amount of catalyst falling within the ranges shown below.

Reaction temperature: 70 to 150° C.
Amount of catalyst to be used: 0.005 to 0.1 equivalent (based on the vinyl acetate moiety).

The degree of saponification achieved by the saponification varies depending on the purpose of saponification, but is preferably at least 80% of the vinyl acetate moieties, more preferably at least 95% thereof, even more preferably at least 98% thereof, still more preferably at least 99% thereof. The degree of saponification can be varied in any desired manner by controlling the conditions for saponification.

In the case of producing an EVOH composition superior particularly in melt stability and also superior in long-run workability, the degree of saponification of the EVOH is preferably 99.7 mol % or more, more preferably 99.8 mol % or more, still more preferably 99.9 mol % or more, and particularly preferably 99.95 mol % or more. For the purpose of obtaining such EVOH, it is preferable to further adjust saponification conditions as follows.

To obtain an EVOH with a degree of saponification of 99.9 mol % or higher, continuous saponification is preferable. Examples of the method for obtaining a high degree of saponification by use of continuous saponification include a method in which a catalyst is added at two or more sites in the saponification reaction column, a method in which an increased amount of catalyst is employed, and a method in which an increased amount of methanol is jetted into the saponification reaction column from its bottom. Examples of the method for obtaining an EVOH with a degree of saponification of 99.9 mol % or higher by use of batchwise saponification include a method in which a catalyst is added separately in two or more portions, a method in which an increased amount of catalyst is employed, and a method in which an increased amount of methanol vapor or nitrogen gas is jetted into the saponification reactor.

The method for producing EVOH pellets from an alcohol solution of the resulting EVOH after the saponification is not particularly limited. Preferably, hydrous pellets are obtained by forming a strand-like solid from an alcoholic solution of EVOH in a coagulation bath and then cutting the strand. Before the forming of the strand, the EVOH concentration may be made higher than that at the time of the saponification by concentrating the alcoholic solution or, alternatively, a solution of EVOH in a water/alcohol mixture or a hydrous composition of EVOH may be prepared through a replacement of part or the whole of methanol by water. Hydrous pellets are obtained by extruding the resulting solution or composition into water or into an aqueous alcohol solution containing a small amount of alcohol to form a strand-like solid and then cutting it. Alternatively, pellets can be produced by cutting the extrudate still in a flowing state without making it form a strand-like solid, and then solidifying it in water.

The hydrous pellets obtained in the manner described above is porous. Therefore, it is easy to remove the saponification catalyst residue by washing with water. It is also easy to add additives to the pellets or to dry the pellets after the removal. Such hydrous pellets preferably have a water content of 10 to 80% by weight because it will result in a great operational advantage. The water content is more preferably 20% by weight or more, and still more preferably 30% by weight or more. In addition, the water content is more preferably 70% by weight or less, and still more preferably 60% by weight or less.

The thus-obtained hydrous pellets usually contain a saponification catalyst residue, namely an alkali metal salt, e.g. sodium acetate, which may cause a yellowing problem or the like. Therefore, it is desirable to remove the alkali metal salt by washing. The content of an alkali metal salt in hydrous pellets before washing is in general approximately from 100 to 10000 µmol/g (per EVOH weight), in terms of alkali metal. The washing method is not particularly restricted, but washing with water is preferred. The water used as a washing liquid herein may be an aqueous solution of acid such as acetic acid in order to remove alkali metal ions efficiently. It is also desirable to reduce the content of the saponification catalyst residue efficiently by combining the washing with water and the washing with acid.

It is desirable to reduce the alkali metal content in hydrous pellets after the washing to 0 to 50 µmol/g (per EVOH weight), in terms of alkali metal. The upper limit of the alkali metal content is more preferably 40 µmol/g, still more preferably 30 µmol/g, and particularly preferably 20 µmol/g. The saponification catalyst residue is generally contained in the form of an alkali metal salt of acetic acid. Therefore, making hydrous pellets after washing have a sufficiently reduced alkali metal content in advance makes it easy to obtain an EVOH composition having a reduced carboxylate group content.

The method for washing the hydrous pellets is not particularly restricted. Any of a batch treatment vessel and a continuous treatment vessel may be employed. In particular, a method in which pellets are treated while being fed continuously in a column vessel is preferable from the viewpoint of productivity.

For the EVOH resin composition (F) for use in the present invention, suitably adopted is a method for producing the EVOH resin composition (F), wherein an EVOH resin is contacted with an aqueous solution containing both carbon dioxide gas and at least one additive selected from the group consisting of an alkali metal salt (A) and a boron compound (B). The aqueous solution with which the EVOH resin is contacted is an aqueous solution containing at least one additive selected from the group consisting of an alkali metal salt (A) and a boron compound (B) and also containing carbon dioxide gas.

The amount of the carbon dioxide gas contained in the aqueous solution is not particularly limited and may be adjusted appropriately. However, it is necessary to dissolve carbon dioxide gas in an amount more than the amount in which carbon dioxide gas contained in the air dissolves spontaneously. The concentration of carbon dioxide gas (the sum of free carbon dioxide and carbonic acid) in the aqueous solution is preferably 0.5 mmol/L or more, more preferably 2 mmol/L or more, and still more preferably 10 mmol/L or more. In order to increase the solubility of carbon dioxide gas, the treatment may be conducted under elevated pressure approximately from 1.5 to 10 atm.

When adopting a method of treating pellets by feeding them continuously by use of a continuous treatment vessel, especially, a column vessel, a too high carbon dioxide gas concentration in the aqueous solution may result in formation of bubbles around EVOH pellets to have some adverse effect on the sedimentation property of resin. Therefore, when such a continuous treatment process is applied, it is preferable in some cases that the carbon dioxide gas concentration in an aqueous solution be lower than the saturated carbon dioxide gas concentration. In such cases, the carbon dioxide gas concentration is set at a value lower than the saturated carbon dioxide gas concentration. It preferably is set to be not higher than 0.95 time the saturated carbon dioxide gas concentration, and more preferably is set to be not higher than 0.9 time the saturated carbon dioxide gas concentration. The concentration is determined depending also on the temperature of a treatment solution and the pressure. On the other hand, when a batch treatment vessel is used, no sedimentation property problem usually arises. However, the upper limit of the carbon dioxide gas concentration may be set in the same manner as continuous treatment vessels if necessary.

In the interest of securing interlayer adhesiveness and long-run workability, it is preferable that the aqueous solution contains an alkali metal salt (A). A preferred range of the content of the alkali metal salt (A) is influenced by the water content of hydrous pellets. In general, however, it is preferably 0.05 to 40 mmol/L. A more preferable lower limit of the content of the alkali metal salt (A) in the aqueous solution is 0.1 mmol/L. A more preferable upper limit is 20 mmol/L. As described later, a desirable content of the alkali metal salt (A) in the EVOH resin composition (F) varies depending on the ethylene content of EVOH. It therefore is preferable to adjust the content of the alkali metal salt (A) in the aqueous solution in response thereto.

The cationic species of the alkali metal salt (A) is not specifically defined. The salt is selected from lithium salts, sodium salts, potassium salts, rubidium salts and cesium salts. Above all, sodium salts and potassium salts are preferable. Potassium salts are particularly preferable. The use of a potassium salt can yield a resin composition superior in both interlayer adhesiveness and long-run workability comprising the EVOH resin composition (F) and the thermoplastic resin (G).

The anionic species of the alkali metal salt (A) is not also specifically defined. The alkali metal salt can be added in the form of carbonate, hydrogencarbonate, phosphate, hydrogenphosphate, hydroxide, carboxylate or the like. Especially, it is preferable to add the salt in the form of carbonate, hydrogencarbonate, hydrogenphosphate or hydroxide. Moreover, it is also preferable to add the alkali metal salt in the form of borate. However, in light of the purpose of the present invention to reduce the content of carboxylate groups, it is not preferable that the alkali metal salt be a carboxylate.

It is preferable that the aqueous solution contains a boron compound (B) because the generation of deposits at a dielip at the time of melt-molding can be inhibited. The concentration of the boron compound (B) in the aqueous solution is preferably 0.1 to 50 mmol/L in terms of boron element because this makes a dry resin composition pellets possible to contain an appropriate amount of boron compound (B). The lower limit of the concentration of the boron compound (B) is more preferably 0.5 mmol/L or more, and still more preferably 1 mmol/L or more. The upper limit thereof is more preferably 40 mmol/L or less, and still more preferably 30 mmol/L or less. If the concentration exceeds 50 mmol/L, the EVOH resin composition (F) is liable to gelation and the external appearance of molded articles may deteriorate.

Examples of the boron compound (B) for use in the preparation of the aqueous solution include, but are not limited to, boric acids, boric acid esters, boric acid salts and borohydrides. Specifically, the boric acids include orthoboric acid, metaboric acid and tetraboric acid; the boric acid esters include triethyl borate and trimethyl borate; and the boric acid salts include alkali metal salts and alkaline earth metal salts of boric acids such as those mentioned above and borax. Among these compounds, preferred is orthoboric acid, which henceforth is sometimes referred simply as boric acid.

In view of the object of the present invention, it is desirable that the aqueous solution contains no carboxylic acid or its salt (C). It, however, should be noted that this does not exclude a case where a carboxylic acid or its salt (C) remaining in the EVOH resin is eluted into the aqueous solution to be contained therein. Moreover, a case where the aqueous solution contains a carboxylic acid or its salt (C) unless the effect of the present invention is adversely affected is not excluded as well.

In order to balance the long-run workability at the time of melt molding and the yellowing resistance, especially in high-temperature molding, and interlayer adhesiveness, it is desirable for the aqueous solution to contain a phosphoric acid compound (D). Containing the phosphoric acid compound (D) in an appropriate amount makes it possible to inhibit yellowing of molded articles and generation of gels and hard spots when melt-molding the resulting EVOH resin composition (F). When adding a phosphoric acid compound (D), the upper limit of the concentration of the phosphoric acid compound (D) in the aqueous solution, in terms of phosphate group, is preferably 10 mmol/L, more preferably 5 mmol/L, still more preferably 3.5 mmol/L, and most preferably 2.5 mmol/L. On the other hand, when adding a phosphoric acid (D), the lower limit of the concentration of the phosphoric acid compound (D) in the aqueous solution, in terms of phosphate group, is preferably 0.01 mmol/L, more preferably 0.03 mmol/L, still more preferably 0.05 mmol/L, and most preferably 0.1 mmol/L.

As the phosphoric acid compound (D) for use in the preparation of the aqueous solution, inorganic phosphoric acid compounds are preferably employed. Examples of such compounds include various acids, such as phosphoric acid and phosphorous acid, and their salts. Phosphoric acid salts may be contained in any form of primary phosphate, secondary phosphate and tertiary phosphate. The species of their cations are not also particularly restricted, but alkali metal salts are preferred. In particular, addition of a phosphoric acid compound (D) in the form of sodium dihydrogenphosphate, potassium dihydrogenphosphate, disodiumhydrogenphosphate or dipotassium hydrogenphosphate is preferred.

The aqueous solution may contain an alkaline earth metal salt (E). However, it is inappropriate to add it in a large amount because alkaline earth metal salts easily form a hardly soluble carbonate. In some applications, addition of the alkaline earth metal salt (E) in an appropriate amount makes it possible to improve the long-run workability when melt-molding the resulting EVOH resin composition (F). Addition of the alkaline earth metal salt (E) may be optionally conducted. When adding, the preferable concentration of the alkaline earth metal salt (E) in the aqueous solution ranges 0 to 10 mmol/L in terms of alkaline earth metal, because this makes a dry resin composition pellets possible to contain an appropriate amount of earth metal salt (E). The upper limit thereof is more preferably 5 mmol/L or less, and still more preferably 3 mmol/L or less.

The species of the cation of the alkaline earth metal salt (E) is not particularly restricted. Examples of the salt include magnesium salts, calcium salts, barium salts and strontium salts. Magnesium salts and calcium salts are preferred. The species of the anion of the alkaline earth metal salt (E) is not also restricted particularly. The alkali metal salt can be added in the form of carbonate, hydrogencarbonate, phosphate, hydrogenphosphate, hydroxide, carboxylate or the like. Especially, it is preferable to add the salt in the form of carbonate, hydrogencarbonate, hydrogenphosphate or hydroxide. In general, many of the alkaline earth metal salts are hardly soluble in water, but their solubilities are increased by the presence of carbonate. However, in light of the purpose of the present invention to reduce the content of carboxylate groups, it is not preferable that the alkali metal salt be a carboxylate.

The pH of the aqueous solution containing the additives and carbon dioxide gas is preferably 3.5 to 6.5. Making an aqueous solution contain at least a certain amount of carbon dioxide gas permits the aqueous solution to be as acidic as described above. The pH value is more preferably 3.8 or more and still more preferably 4 or more. The pH value is more preferably 6.3 or less, still more preferably 6.0 or less, and most preferably 5.8 or less.

The method for preparing the aqueous solution containing the additives and carbon dioxide gas is not particularly restricted. At least one additive selected from the group consisting of an alkali metal salt (A) and a boron compound (B) may be added to an aqueous solution in which carbon dioxide gas was dissolved in advance. Conversely, carbon dioxide gas may be dissolved in an aqueous solution in which at least one additive selected from the group consisting of an alkali metal salt (A) and a boron compound (B) was dissolved in advance. Alternatively, the foregoing several aqueous solutions prepared in advance may be mixed.

The method for contacting EVOH resin with the aqueous solution is not particularly restricted, but a method in which the EVOH resin is immersed in the aqueous solution is desirable. The EVOH resin may have any shape during its immersion in the. aqueous solution, such as powder, granule, sphere and circular cylinder pellet. For example, it is preferable to contact hydrous EVOH pellets obtained in the manner described previously with the aforementioned aqueous solution. To immerse the hydrous pellets in the aqueous solution permits the EVOH resin pellets to contain the alkali metal salt (A) or the boron compound (B) efficiently and homogeneously. The water content of the hydrous pellets before the immersion in the aqueous solution is preferably 10 to 80% by weight. The water content is more preferably 20% by weight or more, and still more preferably 30% by weight or more. In addition, it is more preferably 75% by weight or less, and still more preferably 70% by weight or less.

The temperature of the aqueous solution when it is contacted with EVOH resin is not particularly limited, but it is preferably 10 to 90° C. If the temperature is 10° C. or lower, it may take too much time to make the EVOH resin pellets to contain the alkali metal salt (A) or the boron compound (B) homogeneously. If it exceeds 90° C., the saturation solubility of carbon dioxide gas will decrease and it may be difficult to make the solution contain a sufficient amount of carbon dioxide gas in some cases. In addition, pellets may fuse and attach to each other. The temperature of the aqueous solution is more preferably 20° C. or higher, and still more preferably 30° C. or higher. In addition, it is more preferably 85° C. or lower, and still more preferably 80° C. or lower. When the contact is conducted at a temperature of 70° C. or higher, the solubility of carbonic acid becomes small and, therefore, it is preferable to conduct the contact under pressure almost at 1.5 to 10 atm.

The desirable range of the time for which EVOH resin is contacted with the aqueous solution varies depending on the form of the EVOH resin. For pellets having a size approximately of from 1 to 10 mm, the time is preferably 1 hour or longer, and still more preferably 2 hours or longer.

The method for contacting EVOH resin with the aqueous solution is not particularly restricted. It is permitted to contact the EVOH resin with water in advance and thereafter dissolve carbon dioxide gas or additives in water. However, a method in which an aqueous solution prepared in advance by dissolving those ingredients is contacted with the EVOH resin because an EVOH resin composition (F) with a stable quality which contains additives uniformly can be obtained.

Regarding the mode for contacting the EVOH resin with the aqueous solution, any of a batch mode and a continuous mode may be adopted. In the continuous mode, a preferable example is a method in which an EVOH resin is moved downward slowly in a column-type vessel and the resin is simultaneously contacted with an aqueous solution which is fed continuously.

It is also permitted to prepare two or more aqueous solutions and then carry out the contact in two or more times. For example, a method which comprises contacting first with an aqueous solution containing an alkali metal salt (A) or a boron compound (B) only and then contacting with an aqueous solution containing carbon dioxide gas in addition to the alkali metal salt (A) or the boron compound (B) may also be adopted.

Moreover, another adoptable method is one comprising contacting an EVOH resin with an aqueous solution containing carbon dioxide gas in addition to an alkali metal salt (A) or a boron compound (B) through immersion of the resin in the solution and then charging the resin to an extruder followed by contacting, in the extruder, the resin with an aqueous solution containing an alkali metal salt (A), a boron compound (B), a phosphoric acid compound (D) or an alkaline earth metal salt (E) and melt kneading the mixture.

EVOH resin, preferably EVOH resin pellets, is contacted with the aqueous solution first, then dewatered if necessary, and thereafter is subjected to a drying step. The drying method is not particularly restricted. A hot air dryer or the like may be employed. The EVOH resin may also be dried while being melt-kneaded in an extruder with a vent. As a dryer, either a fluidized dryer or a static dryer is available. Alternatively, these dryers may be used in combination. Preferred is a method comprising drying by the fluidized drying method first and subsequently drying by the static drying method. The drying temperature is not particularly limited, but a temperature from about 70 to 120° C. is generally employed. The temperature may be increased with the progress of the drying. The water content after the drying is generally 1% by weight or less, and preferably 0.5% by weight of less. The thus obtained dry pellets are melt kneaded with a thermoplastic resin (G) other than EVOH.

In the above-described method for producing the EVOH resin composition (F), a resin composition containing almost no carboxylate group can be obtained. Therefore, an environmentally friendly production method in which no carboxylic acid volatilizes in this drying step and no carboxylic acid is released to the surrounding can be provided.

The EVOH resin composition (F) employed suitably in the present invention is an EVOH resin composition (F) that contains 0.1 to 20 μmol/g, in terms of alkali metal, of an alkali metal salt (A), 0 to 2 μmol/g of a carboxylate group (C1) which is extracted through an immersion treatment in water at 95° C. for 10 hours, and 0 to 40 μmol/g of a carboxylate group (C2) which is extracted through an immersion treatment in a 0.05 N aqueous sodium hydroxide solution at 95° C. for 10 hours.

This EVOH resin composition (F) is an EVOH resin composition (F) which releases less odor and which is superior in long-run workability at the time of melt molding. The EVOH resin composition (F) is preferably a composition produced by the above-described production method, but it is not restricted to one produced by that method.

This EVOH resin composition (F) contains 0.1 to 20 μmol/g, in terms of alkali metal, of an alkali metal salt (A). Containing the alkali metal salt (A) improves a resin composition comprising the EVOH resin composition (F) and the thermoplastic resin (G) in interlayer adhesiveness, and yellowing resistance at the time of melting and long-run workability. When the content is less than 0.1 μmol/g, both the yellowing resistance and the long-run workability at the time of melting are insufficient. If the content exceeds 20 μmol/g, the yellowing resistance at the time of melting will be poor. When the content is within the range of 0.1 to 0.3 μmol/g, the yellowing resistance at the time of melting and the long-run workability are relatively good. However, when being with other resins in a multilayer structure, use of a normal acid anhydride-modified adhesive resin will achieve an insufficient adhesive strength. The lower limit of the content of the alkali metal salt (A) is more preferably 0.3 μmol/g or more, and still more preferably 0.5 μmol/g or more. The upper limit of the content of the alkali metal salt (A) is preferably 15 μmol/g or less, more preferably 10 μmol/g or less, and particularly preferably 8 μmol/g or less.

It is preferable that the content of the alkali metal salt (A) and the ethylene content of the EVOH satisfy the following formula (1):

$$0.95 \times \exp(0.039 \times ET) - 2 \leq a \leq 0.95 \times \exp(0.039 \times ET) + 2 \quad (1)$$

wherein a is the content (μmol/g) of the alkali metal salt (A) in terms of alkali metal and ET is the ethylene content (mol %) of the ethylene-vinyl alcohol copolymer.

When the content of the alkali metal salt (A) is larger beyond the range provided by formula (1) above, the hue of the EVOH resin composition (F) may get worse. On the other hand, when the content is less beyond the range provided by formula (1) above, the long-run workability and the adhesiveness may be reduced. The two contents more preferably satisfy the following formula (1') and still more preferably satisfy the following formula (1").

$$0.95 \times \exp(0.039 \times ET) - 1.5 \leq a \leq 0.95 \times \exp(0.039 \times ET) + 1.5 \quad (1')$$

$$0.95 \times \exp(0.039 \times ET) - 1 \leq a \leq 0.95 \times \exp(0.039 \times ET) + 1 \quad (1'')$$

The EVOH resin composition (F) for use in the present invention contains 0 to 2 µmol/g of a carboxylate group (C1) which is extracted through an immersion treatment in water at 95° C. for 10 hours. Because most of the carboxylic acid and the salt thereof contained in the EVOH resin composition (F) are extracted through the immersion treatment in water at 95° C. for 10 hours, a value almost corresponding to the total content of the acid and salt is indicated for the carboxylate group (C1). In other words, the EVOH resin composition (F) is a resin composition having an extremely small content of a carboxylic acid and a salt thereof. The content of the carboxylate group (C1) is preferably 1.5 µmol/g or less, more preferably 1.0 µmol/g or less, and still more preferably 0.5 µmol/g or less.

The EVOH resin composition (F) for use in the present invention contains 0 to 40 µmol/g of a carboxylate group (C2) which is extracted through an immersion treatment in a 0.05 N aqueous sodium hydroxide solution at 95° C. for 10 hours. Through the immersion treatment in a 0.05 N aqueous sodium hydroxide solution at 95° C. for 10 hours, most of the carboxylic acid and the salt thereof contained in the EVOH resin composition (F) are extracted. In addition, saponification reaction proceeds at most of the unsaponified carboxylic acid ester groups remaining in an EVOH resin and a carboxylate group, which is a hydrolysis product, is liberated to be extracted. In other words, the EVOH resin composition (F) is a resin composition having a small total content of a carboxylic acid, a salt thereof and a carboxylic acid ester group. The content of the carboxylate group (C2) is preferably 20 µmol/g or less, more preferably 10 µmol/g or less, still more preferably 5 µmol/g or less, and most preferably 2 µmol/g or less.

At the time of melt kneading of the EVOH resin composition (F), the temperature usually reaches 200° C. or higher. At such temperatures, many types of chemical reactions can proceed. Carboxylic acid ester groups contained in an EVOH resin are assumed to be hydrolyzed through a reaction with water to liberate carboxylic acids or are assumed to undergo transesterification with carboxylic acids or carboxylic acid salts. Moreover, carboxylic acids or their salts are assumed to react with hydroxyl groups in EVOH to form carboxylic acid ester groups or are assumed to undergo transesterification with carboxylic acid ester groups. In other words, in melt-molding, especially, long melt-molding, chemical reactions which occur within molten resin during the melting by heating cannot be disregarded.

The EVOH resin composition (F), which resulted from focusing attention in this respect, intends to achieve both improvements in melt stability of resin and prevention of odor generation by controlling the sum of the contents of carboxylic acids, salts thereof and carboxylic acid esters, which can be converted reciprocally. By reducing, to an extremely small amount, a carboxylate group (C1) which was originally and still is liberated and which is extracted through an immersion treatment in water at 95° C. for 10 hours and by controlling the amount of a carboxylate group (C2) which is extracted through an immersion treatment in a 0.05 N aqueous sodium hydroxide solution at 95° C. for 10 hours, the amount being that of substances including what can be liberated under heating and melting conditions to a certain value or smaller, a resin composition extremely superior in long-run workability is obtained.

Another EVOH resin composition (F) suitably used in the present invention is an EVOH resin composition (F) wherein the composition contains 0.1 to 20 µmol/g, in terms of alkali metal, of an alkali metal salt (A) and 0 to 2 µmol/g of a carboxylate group (C1) which is extracted through an immersion treatment in water at 95° C. for 10 hours, and wherein the degree of saponification is 99.7 to 100 mol %.

This, which is a resin composition similar to the aforementioned EVOH resin composition (F), is expressed, in degree of saponification, the amount of unsaponified carboxylic acid groups instead of carboxylate group (C2) which is extracted through an immersion treatment in a 0.05 N aqueous sodium hydroxide solution at 95° C. for 10 hours. When the degree of saponification of EVOH is 99.7 mol % or more, a good long-run workability at the time of melt molding is achieved. The degree of saponification is more preferably 99.8 mol % or more, still more preferably 99.9 mol % or more, and especially preferably 99.95 mol % or more.

It is preferable that the EVOH resin composition (F) to be used in the present invention further contain a boron compound (B) because the generation of deposits at a dielip at the time of melt-molding can be inhibited. The effect of the incorporation of the boron compound (B) and the kind thereof are the same as those described in the description of the method for producing the EVOH resin composition (F). The content of the boron compound (B) is preferably 1 to 200 µmol/g in terms of boron element. It is more preferably 2 µmol/g or more, and still more preferably 3 µmol/g or more. On the other hand, it is more preferably 150 µmol/g or less, and still more preferably 100 µmol/g or less.

Moreover, it is preferable that the EVOH resin composition (F) contain a phosphoric acid compound (D) for balancing the long-run workability at the time of melt molding and yellowing resistance, especially in high-temperature molding, and the interlayer adhesiveness. The effect of the incorporation of the phosphoric acid compound (D) and the kind thereof are the same as those described in the description of the method for producing the EVOH resin composition (F). The upper limit of the content of the phosphoric acid compound (D), in terms of phosphate group, is preferably 5 µmol/g, more preferably 4 mol/g, still more preferably 3 µmol/g, and most preferably 1.5 µmol/g. When the content of the phosphoric acid compound (D) is too much, the long-run workability may deteriorate. On the other hand, the lower limit of the content of the phosphoric acid compound (D), in terms of phosphate group, is preferably 0.05 µmol/g, more preferably 0.1 µmol/g, still more preferably 0.15 µmol/g, and most preferably 0.2 µmol/g.

In this situation, it is preferable that in the EVOH resin composition (F) the ratio (a/d) of the content (a: µmol/g) of the alkali metal salt (A) in terms of alkali metal to the content (d: µmol/g) of the phosphoric acid compound (D) in terms of phosphate group be 2.4 to 50. This can result in a resin composition superior in hue and long-run workability. When the ratio (a/d) is less than 2.4, the long-run workability may be reduced. On the other hand, when the ratio (a/d) exceeds 50, the hue may get worse and, in some cases, the long-run workability may be adversely affected. The ratio (a/d) is more preferably not more than 40, and still more preferably not more than 30.

The EVOH resin composition (F) may also contain an alkaline earth metal salt (E). The effect of the incorporation of the alkaline earth metal salt (E) and the kind thereof are the same as those described in the description of the method for producing the EVOH resin composition (F). The content of the alkaline earth metal salt (E) is preferably 0 to 10 µmol/g in terms of alkaline earth metal. It is more preferably 5 µmol/g or less, and still more preferably 3 µmol/g or less. Especially, when importance is placed on inhibition of yellowing at the time of melt molding, the content of the alkaline earth metal salt (E) is more preferably not more than 2 µmol/g, and still more preferably not more than 1 µmol/g. It is preferable that substantially no alkaline earth metal salt (E) be contained.

A desirable melt flow rate (MFR) (measured at 190° C. under a load of 2160 g; provided that the melting point at nearly 190° C. or higher, the measurements are carried out under 2160 g load at two or more temperatures not lower than the melting point. The results are plotted, in a semilog graph, with reciprocals of absolute temperatures as abscissa against logarithms of MFRs as ordinate and the preferable MFR is represented by an extrapolation to 190° C.) of the EVOH resin composition (F) to be used in the present invention is preferably 0.1 to 200 g/10 min. The lower limit of MFR is more preferably not lower than 0.2 g/10 min, still more preferably not lower than 0.5 g/10 min, and most preferably not lower than 1 g/10 min. The upper limit of MFR is more preferably 50 g/10 min or lower, still more preferably 30 g/10 min or lower, and most preferably 15 g/10 min or lower. The cases where the melt flow rate is low beyond these ranges are not preferred because the inside of an extruder during molding will be in a high torque condition and it may become difficult to melt knead with the thermoplastic resin (G). The cases where the melt flow rate is high beyond those ranges are not preferred because the mechanical strength of molded articles obtained by molding the resin composition comprising the EVOH resin composition (F) and the thermoplastic resin (G) may be insufficient.

When the EVOH resin composition (F) contains a phosphoric acid compound (D), it is preferable that a molded article obtained through melt molding of the composition have a ratio (d/t) of the content (d: µmol/g) of a phosphoric acid compound (D) in terms of phosphate group to the content (t: mol/g) of phosphorus element of 0.4 or less and the composition contain substantially no organophosphorus compound extractable in chloroform.

The content (d) of a phosphoric acid compound (D) used herein is, for example, a value calculated from the amount of the phosphate group extracted from a melt-molded article when the article is immersed in an aqueous solution. In other words, the content (d) indicates the amount of the phosphoric acid compound (D) which is contained in the form of phosphoric acid or its salt in a melt molded article and which can be extracted with an aqueous solution. On the other hand, the content (t) of phosphorus element is, for example, a value determined through measurement by optical emission spectrometry for the amount of phosphorus element contained in an aqueous solution obtained by dissolving ash resulting from complete combustion of a melt-molded article. In other words, determined is not only the phosphorus element to be extracted through an extraction operation in an aqueous solution but the whole phosphorus element contained in a melt-molded article. Accordingly, the fact that the ratio (d/t) is 0.4 or less means that not less than half of the whole phosphorus element contained in the melt-molded article is contained in the form which can not be extracted.

Up to date, it has been reported that in the case of making a phosphoric acid compound (D) be contained in EVOH, approximately all the phosphoric acid compound (D) contained in an EVOH resin composition can be extracted. Moreover, also after melt-molding the resin composition, approximately all phosphoric acid compound (D) can be extracted. Therefore, the ratio (d/t) is a value close to 1 after melt-molding as well. As opposed to this, the EVOH resin composition (F) used in the present invention is characterized in that when the composition is made contain a phosphoric acid compound (D) through its immersion in an aqueous solution and then only dried, it is possible to extract approximately all the compound, whereas when further heated in a molten state, it will become impossible to extract that compound. In addition, when the composition is heated at a relatively high temperature, the ratio (d/t) tends to decrease even if the temperature is not higher than the melting point. Thus, in some cases, the ratio (d/t) tends to decrease not only in melt-molded articles but also in pellets resulting from a long-time heat-drying treatment.

It is not necessarily clear that in what chemical structure the phosphorus element contained in the above-mentioned melt-molded article exists. However, it is assumed that the phosphoric acid compound (D) is in the form of a phosphoric acid ester resulting from its reaction with a hydroxyl group of EVOH. It is assumed that fixing the phosphoric acid compound (D) to the molecular chain of EVOH is preventing the compound from being extracted. It is conceivable that features never known before have been achieved through the adoption of a method never known before, such as immersion in an aqueous solution containing carbon dioxide gas, instead of use of carboxylic acids such as acetic acid. The method for producing a melt-molded article having a ratio (d/t) of 0.4 or less is not particularly restricted.

A resulting melt-molded articles having a ratio (d/t) of 0.4 or less is superior in long-run workability. It is also conceivable that the phosphorus element assumed to be fixed to the molecular chain of EVOH contributes to the heat stability. The ratio (d/t) is preferably 0.35 or less, more preferably 0.3 or less, still more preferably 0.25 or less, and most preferably 0.2 or less.

A preferable range of the phosphorus element content (t) is the same as the content of phosphoric acid compound (D) in the aforementioned EVOH resin composition (F). This is because the phosphorus element content (t) does not differ substantially before and after the melt heating. The content is preferably 5 µmol/g, more preferably 4 µmol/g, still more preferably 3 µmol/g, and most preferably 1.5 µmol/g. On the other hand, the lower limit of the phosphorus element content (t) is preferably 0.05 µmol/g, more preferably 0.1 µmol/g, still more preferably 0.15 µmol/g, and most preferably 0.2 µmol/g.

In some applications, the EVOH resin composition (F) contains an organophosphorus compound such an antioxidant. In some of such instances, a composition contains a considerable amount of phosphorus compound which is unextractable in water even though it is not fixed to the molecular chain of EVOH and the ratio (d/t) may become 0.4 or less. However, the long-run workability is not always excellent. Therefore, for being distinguished from such resin compositions, the above-mentioned melt-molded article preferably contains substantially no organophosphorus compound which is extractable with chloroform. To contain substantially no organophosphorus compound means, for example, that the content thereof is less than 0.01 µmol/g.

The types and contents of the alkali metal salt (A), boron compound (B), carboxylate groups (C1, C2) and alkaline earth metal salt (E) in the above-mentioned melt-molded article are the same as those in the cases of the EVOH resin composition previously mentioned. In addition, the same statements are true for the type of the EVOH to be used and the relation between the content of the alkali metal salt (A) and the ethylene content of the EVOH. These values substantially do not change before and after the melt molding.

The resin composition of the present invention is a resin composition comprising the EVOH resin composition (F) and a thermoplastic (G) other than EVOH. Here, the thermoplastic resin (G) other than EVOH includes modified EVOH containing structural units other than ethylene units, vinyl alcohol units and unsaponified vinyl acetate units.

In the present invention, it is preferable to incorporate as the thermoplastic resin (G) other than EVOH at least one resin selected from the group consisting of polyolefin (G1), polyamide (G2) and a modified ethylene-vinyl alcohol copolymer (G3) having an ethylene content of 5 to 55 mol % and containing 0.3 to 40 mol % of the following structural unit (I). The following is a concrete description about the cases where each of the resins is incorporated.

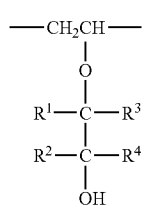
(I)

wherein $R^1$, $R^2$, $R^3$ and $R^4$ each denote a hydrogen atom, an aliphatic hydrocarbon group having 1 to 10 carbon atoms, an alicyclic hydrocarbon group having 3 to 10 carbon atoms or an aromatic hydrocarbon group having 6 to 10 carbon atoms; $R^1$, $R^2$, $R^3$ and $R^4$ may be the same group or may differ from each other; $R^3$ and $R^4$ may be combined together; and $R^1$, $R^2$, $R^3$ and $R^4$ each may have a hydroxyl group, a carboxyl group or a halogen atom.

By blending the EVOH resin composition (F) with the polyolefin (G1), it is possible to improve the flexural fatigue resistance and the impact resistance of the EVOH resin composition (F). In addition, it is also possible to improve the gas barrier properties of the polyolefin resin (G1). Furthermore, in multilayer co-extrusion molding using polyolefin and EVOH, if a layer of the resin composition of the present invention is used in place of a layer of the polyolefin or a layer of the EVOH or if a layer of the resin composition of the present invention is formed between a layer of the polyolefin and a layer of the EVOH, it is also possible to improve the interlayer adhesiveness.

Examples of the polyolefin (G1) to be used include high-density, middle-density or low-density polyethylene, polyethylene in which an α-olefin, such as butene, hexene and 4-methyl-1-pentene, is copolymerized, ionomer resin, polypropylene homopolymer, polypropylene in which ethylene is graft-copolymerized, polypropylene in which an α-olefin, such as ethylene, butene, hexene and 4-methyl-1-pentene, is copolymerized, modified polypropylene in which a rubber polymer is blended, poly-1-butene, poly-4-methyl-1-pentene, and modified polyolefins obtained by reacting maleic anhydride with the aforementioned polyolefins.

In a preferred embodiment, the resin composition of the present invention comprises 0.1 to 99.9% by weight of the EVOH resin composition (F) and 0.1 to 99.9% by weight of the polyolefin (G1). The incorporation proportions of the EVOH resin composition (F) and the polyolefin (G1) are adjusted depending on the purpose. However, regarding the composition proportions of the EVOH resin composition (F) and the polyolefin (G1), a composition such that one of the resins is more than the other is important from a practical use standpoint because characteristic properties such as mechanical properties and gas barrier properties can be exhibited. On the other hand, as a composition with much EVOH, that having a weight ratio of EVOH resin composition (F):polyolefin (G1) is preferably from 0.1:99.9 to 20:80, and particularly preferably from 0.3:99.7 to 10:90. On the other hand, as a composition with much EVOH, that having a weight ratio of EVOH resin composition (F):polyolefin (G1) of from 70:30 to 95:5 is particularly important.

By blending the EVOH resin composition (F) with the polyamide (G2), the flexural fatigue resistance and the impact resistance of the EVOH resin composition (F) can be improved. In addition, it is also possible to improve the gas barrier properties of the polyamide (G2). In particular, the hot water resistance (retort resistance) of multilayer structures, particularly pouches made of a multilayer film, having a layer of the resin composition comprising the EVOH resin composition (F) and the polyamide (G2) is improved.

The polyamide (G2) to be used is not particularly restricted, but it preferably is a polyamide (G2) composed mainly of caproamide. Concretely, it is desirable that caproamide units account for 75 mol % or more of the units constituting the polyamide (G2). Examples of such polyamide (G2) include polycaproamide (PA6), caprolactam/lauryl lactam copolymers (PA6/12), and caprolactam/hexamethylene adipamide copolymers (PA6/66).

In addition, examples of structural units other than caproamide units include structural units derived from cyclic lactams such as butyrolactam and lauryllactam; aminocarboxylic acids such as 1,10-aminocapric acid and 1,12-aminododecanoic acid; dicarboxylic acids such as malonic acid, succinic acid, glutaric acid, adipic acid, pimelic acid, suberic acid, azelaic acid, sebacic acid, undecanedionic acid, dodecanedioic acid, hexadecanedionic acid, eicosanedionic acid, eicosenedionic acid, docosanedionic acid, 2,2,4-trimethyladipic acid, dimer acid, 1,4-cyclohexanedicarboxylic acid, terephthalic acid, isophthalic acid, phthalic acid and xylylenedicarboxylic acid; diamines such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, hexadecamethylenediamine, 2,2,4 (or 2,4,4)-trimethylhexamethylenediamine, cyclohexanediamine, methylcyclohexanediamine, bis-(4,4'-aminocyclohexyl) methane, xylylenediamine and phenylenediamine.

The relative viscosity [ηr] of the polyamide (G2) is preferably within the range of from 2.0 to 7.0, and more preferably from 2.5 to 5.0. If the relative viscosity [ηr] is less than 2.0, it may be difficult for the resulting resin composition to be formed into a strand or a film during its melt molding. On the other hand, if the relative viscosity [ηr] is greater than 7.0, the polyamide will have a too high melt viscosity and therefore may exhibit a low compatibility with EVOH. This may make it impossible to obtain a favorable melt moldability.

The MFR of the polyamide (G2) is preferably within the range of from 0.1 to 100 g/10 min (230° C., 2160 g), and more preferably from 1 to 50 g/10 min (230° C., 2160 g). If the MFR is smaller than 0.1 g/10 min, the polyamide will have a too high melt viscosity and therefore may exhibit a low compatibility with EVOH. This may cause reduction of melt moldability. On the other hand, if the MFR is greater than 100 g/10 min, it may be difficult for the resulting resin composition to be formed into a strand or a film during its melt molding.

Of such polyamides (G2), preferably employed is a polyamide (G2) having terminal amino groups in an amount of not more than 15/1,000,000 equivalent weight per gram of resin, namely, 15 μeq/g (15 μmol/g) or less. Use of such a polyamide (G2) improves the hue of a film obtained by molding the resin composition of the present invention and inhibits the occurrence of fish eyes. The amount of terminal amino groups in polyamide (G2) is more preferably 10 μeq/g or less, still more preferably 7 µeq/g or less, and particularly preferably 4 µeq/g or less. If the amount of terminal amino groups is greater than 15 µeq/g, the long-run workability during molding, which is a feature of the resin composition of the present invention, may not be exhibited or the hue of the composition may be deteriorated.

It is preferable that 70 mol % or more of the whole terminals of the polyamide (G2) be capped with units including an imide structure. If the ratio is less than 70 mol %, the long-run workability during molding, which is a feature of the resin composition of the present invention, tends to deteriorate and it may become difficult to obtain molded articles superior in appearance. The ratio is more preferably 80 mol % or more.

The imide structure is not particularly restricted. It is preferable that at least part of the imide structures in the polyamide (G2) be a cyclic imide structure. Examples of such cyclic imide include phthalimide, succinimide, glutarimide, 3-methylglutarimide, maleimide, dimethylmaleimide, trimellitimide and pyromellitimide. Of these imides, phthalimide and succinimide are more preferable.

In a preferred embodiment, the resin composition of the present invention comprises 1 to 99% by weight of the EVOH resin composition (F) and 1 to 99% by weight of the polyamide (G2). The incorporation proportions of the EVOH resin composition (F) and the polyamide (G2) are adjusted depending on the purpose. From the standpoint of improving the flexibility and the hot water resistance of EVOH and obtaining good barrier properties, it is preferable that the content of the EVOH resin composition (F) be 50% by weight or more, and more preferably 60% by weight or more. In this case, it is preferable that the content of the polyamide (G2) be 50% by weight or less, and more preferably 40% by weight or less. On the other hand, in order to clarify the effect of improving the flexibility or the hot water resistance, it is preferable that the content of the EVOH resin composition (F) be 95% by weight or less, and more preferably 90% by weight or less. In this case, it is preferable that the content of the polyamide (G2) be 5% by weight or more, and more preferably 10% by weight or more.

By blending the EVOH resin composition (F) with a modified ethylene-vinyl alcohol copolymer (henceforth may be abbreviated as modified EVOH) (G3) having an ethylene content of 5 to 55 mol % and containing 0.3 to 40 mol % of the following structural unit (I), it is possible to improve the flexibility and the secondary processability of the EVOH resin composition (F) while preventing the deterioration of barrier properties and transparency.

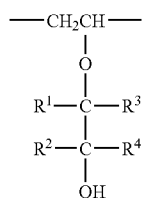

(I)

wherein $R^1$, $R^2$, $R^3$ and $R^4$ denote a hydrogen atom, an aliphatic hydrocarbon group having 1 to 10 carbon atoms (e.g., an alkyl group and an alkenyl group), an alicyclic hydrocarbon group having 3 to 10 carbon atoms (e.g., a cycloalkyl group and a cycloalkenyl group) and an aromatic hydrocarbon group having 6 to 10 carbon atoms (e.g., a phenyl group); $R^1$, $R^2$, $R^3$ and $R^4$ may be the same group or may differ; $R^3$ and $R^4$ may be combined together, provided that the case where both $R^3$ and $R^4$ are hydrogen atoms is excluded; and $R^1$, $R^2$, $R^3$ and $R^4$ may have other groups, for example, a hydroxyl group, a carboxyl group and a halogen atom.

In a preferred embodiment, both $R^1$ and $R^2$ are hydrogen atoms. In a more preferable embodiment, both $R^1$ and $R^2$ are hydrogen atoms and one of $R^3$ and $R^4$ is an aliphatic hydrocarbon group having 1 to 10 carbon atoms and the other is a hydrogen atom. Preferably, the aliphatic hydrocarbon group is an alkyl group or an alkenyl group. From a viewpoint of attaching great importance to the gas barrier property required when the modified EVOH (G3) is used as a barrier material, it is more preferable that one of $R^3$ and $R^4$ be a methyl group or an ethyl group and the other be a hydrogen atom.

In addition, from a viewpoint of the gas barrier property required when the modified EVOH (G3) is used as a barrier material, it is preferable also that one of $R^3$ and $R^4$ be a substituent represented by $(CH_2)_iOH$, wherein i is an integer of 1 to 8, and the other be a hydrogen atom. When much importance is attached to the gas barrier property as a barrier material, in the substituent represented by $(CH_2)_iOH$, i is preferably an integer of 1 to 4, more preferably 1 or 2, and still more preferably 1.

The amount of the structure unit (I) contained in the modified EVOH (G3) needs to fall within the range of 0.3 to 40 mol %. The lower limit of the amount of the structure unit (I) is preferably not less than 0.5 mol %, more preferably not less than 1 mol %, and still more preferably not less than 2 mol %. On the other hand, the upper limit of the amount of the structure unit (I) is not more than 35 mol %, more preferably not more than 30 mol %, and still more preferably not more than 25 mol %. A modified EVOH (G3) superior simultaneously in gas barrier property, stretchability, flexibility and flexing resistance can be obtained when the amount of the structure unit (I) contained therein falls within the range mentioned above.

It is preferable that the ethylene content in the modified EVOH (G3) be 5 to 55 mol %. From a viewpoint where the modified EVOH (G3) becomes superior in stretchability, flexibility and flexing resistance, the lower limit of the ethylene content of the modified EVOH (G3) is more preferably not less than 10 mol %, still more preferably not less than 20 mol %, particularly preferably not less than 25 mol %, and more preferably not less than 31 mol %. On the other hand, from a viewpoint of the gas barrier property of the modified EVOH (G3), the upper limit of the ethylene content of the modified EVOH (G3) is more preferably not more than 50 mol %, still more preferably not more than 45 mol %. When the ethylene content is less than 5 mol %, the melt moldability may become poor, whereas when it exceeds 55 mol %, the gas barrier property may be insufficient.

The constituents of the modified EVOH (G3) other than the aforementioned structure units (I) and ethylene units are mainly vinyl alcohol units. The vinyl alcohol units are usually vinyl alcohol units which did not reacted with monofunctional epoxy compounds of the vinyl alcohol units contained in a starting EVOH. Unsaponified vinyl acetate units which may be contained in the EVOH are usually contained in the modified EVOH (G3) as they are. Measurement results of NMR and melting point showed that the modified EVOH (G3) is a random copolymer which contains these constituents. Furthermore, other constituents may also be contained unless the object of the present invention is damaged.

A preferable melt flow rate (MFR) (measured at 190° C., 2160 g load) of the modified EVOH (G3) is 0.1 to 30 g/10 minutes, more preferably 0.3 to 25 g/10 minutes, and still more preferably 0.5 to 20 g/10 minutes. It is note that when a melting point is about 190° C. or over 190° C., the measurements are carried out under 2160 g load at two or more temperatures not lower than the melting point. The results are plotted, in a semilog graph, with reciprocals of absolute temperatures as abscissa against logarithms of MFRs as ordinate and the MFR is represented by an extrapolation to 190° C.

The method for producing the modified EVOH (G3) is not limited particularly. The method that the present inventors recommend is a method in which the modified EVOH (G3) is obtained by reacting the starting materials, an EVOH and a monofunctional epoxy compound having a molecular weight of not more than 500, together.

As the EVOH to be used as a starting material to the modified EVOH (G3) in the present invention, that the same as the aforementioned EVOH to be used as a starting material of the EVOH resin composition (F) can be employed. Here, an EVOH resin composition which optionally contains at least one substance selected from the group consisting of alkali metal salt (A), boron compound (B), carboxylic acid or its salt (C), phosphoric acid compound (D) and alkaline earth metal salt (E) may also be used as a starting material. In this situation, preferable contents of these additives are the same as the preferable contents thereof in the aforementioned EVOH resin composition (F).

The epoxy compound to be used for the production of the modified EVOH (G3) in the present invention must be a monofunctional epoxy compound. In other words, it must be an epoxy compound which has only one epoxy group in its molecule. When a polyfunctional epoxy compound of two or more functionalities is used, the effect of the present invention cannot be obtained. It is to be noted that during the production of the monofunctional epoxy compound, a very small amount of polyfunctional epoxy compound may be contained. Unless the effect of the present invention is inhibited, a monofunctional epoxy compound containing a very small amount of polyfunctional epoxy compound can be used as the monofunctional epoxy compound having a molecular weight of not more than 500 in the present invention.

The monofunctional epoxy compound having a molecular weight of not more than 500 to be used in the present invention is not limited particularly. Specifically, compounds represented by the following formulae (III) through (IX) can be used suitablly:

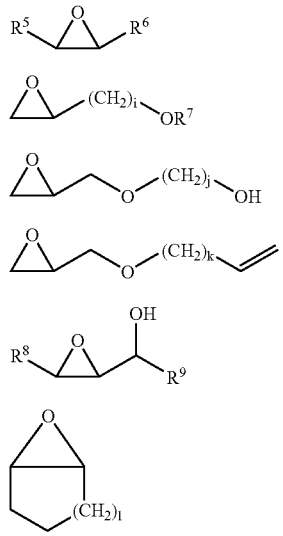

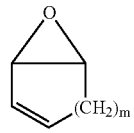

wherein $R^5$, $R^6$, $R^7$, $R^8$ and $R^9$ each represent a hydrogen atom, an aliphatic hydrocarbon group (e.g., alkyl group, alkenyl group or the like) having 1 to 10 carbon atoms, an alicyclic hydrocarbon group (e.g., cycloalkyl group, cycloalkenyl group or the like) having 3 to 10 carbon atoms or an aromatic hydrocarbon group having 6 to 10 carbon atoms (e.g., phenyl group or the like); and i, j, k, l and m each denote an integer of 1 to 8.

Of these monofunctional epoxy compounds having a molecular weight of not more than 500, epoxy compounds having 2 to 8 carbon atoms are particularly preferred as a monofunctional epoxy compound to be used in the present invention. The number of carbon atoms of the monofunctional epoxy compound is preferably 2 to 6, more preferably 2 to 4 from the viewpoints of the easiness to handle the compound and the reactivity of the compound with EVOH during the production of a modified EVOH. Moreover, it is preferable that the monofunctional epoxy compound be a compound represented by the formula (III) or (IV). From the viewpoints of the reactivity with EVOH and the gas barrier property of a modified EVOH (G3) to be obtained, 1,2-epoxybutane, 2,3-epoxybutane, epoxypropane, epoxyethane and glycidol are particularly preferable. Above all, epoxypropane and glycidol are preferable. In the applications in which sanitariness is required, such as food packaging, drink packaging and drug packaging, it is desirable to use 1,2-epoxybutane, 2,3-epoxybutane, epoxypropane and epoxyethane as the monofunctional epoxy compound. Particularly, epoxypropane is preferably employed.

A modified EVOH (G3) is obtained by reacting the starting materials, i.e. EVOH and the above-mentioned monofunctional epoxy compound. A preferable mixing ratio of the EVOH and the monofunctional epoxy compound is 1 to 50 parts by weight of the monofunctional compound to 100 parts by weight of the EVOH, more preferably 2 to 40 parts by weight of the monofunctional epoxy compound to 100 parts by weight of the EVOH, and particularly preferably 5 to 35 parts by weight of the monofunctional compound to 100 parts by weight of the EVOH.

The method for producing the modified EVOH (G3) by reacting the starting EVOH and monofunctional epoxy compound having a molecular weight of not more than 500 is not particularly limited. Examples of preferable methods include a production method in which the EVOH and the monofunctional epoxy compound are reacted in a solution and a production method in which the EVOH and the monofunctional epoxy compound are reacted in an extruder. Particularly preferred is a production method in which the EVOH and the monofunctional epoxy compound are melt kneaded to react in an extruder. It is also desirable to use a catalyst containing a metal ion of Group III to XII in the periodic table when melt kneading to react. The production method of the modified EVOH (G3) to be used in the present invention is described in detail in a pamphlet of International Publication No. WO 02/92643.

In addition, at least one substance selected from the group consisting of alkali metal salt (A), boron compound (B), carboxylic acid or its salt (C), phosphoric acid compound (D) and alkaline earth metal salt (E) may also be added to the modified EVOH (G3) after the modified EVOH (G3) is obtained through a reaction of the EVOH and the monofunctional epoxy compound.

The combination of the respective ethylene contents of the modified EVOH (G3) and the EVOH resin composition (F) is adjusted depending upon the application and purpose of the resin composition. For example, it is desirable that the difference between the ethylene content of the modified EVOH (G3) and the ethylene content of the EVOH resin composition (F) be from 2 to 30 mol %. The difference is more preferably not less than 5 mol % but not more than 20 mol %.

In the case where there is a difference in ethylene content between the modified EVOH (G3) and the EVOH resin composition (F) as mentioned above, when the ethylene content of the modified EVOH (G3) is greater than the ethylene content of the EVOH resin composition (F), it is possible to maintain the properties of the EVOH resin composition (F) superior in gas barrier properties and also to incorporate therein the modified EVOH (G3) extremely superior in flexibility. As a result, it is possible to provide a resin composition which is superior in secondary processability, such as thermoformability and stretchability, or flexibility and flexing resistance and also superior in bas barrier properties. This embodiment is one of the particularly useful embodiments. On the other hand, it is desirable in some cases that the ethylene content of the modified EVOH (G3) be smaller than the ethylene content of the EVOH resin composition (F). Such a situation is beneficial for conducting molding at low temperature because their melting points becomes close to each other.

On the other hand, it is also desirable in some cases that the difference in ethylene content between the modified EVOH (G3) and the EVOH resin composition (F) be small. In such cases, the difference is desirably 2 mol % or less. It is more desirable to use a modified EVOH (G3) and an EVOH resin composition (F) both having substantially the same ethylene content. By making the difference in ethylene content between the modified EVOH (G3) and the EVOH resin composition (F) small, it is possible to obtain a resin composition particularly superior in barrier properties and transparency while improving flexibility, secondary processability, fatigue resistance and interlayer adhesiveness.

In a preferred embodiment, the resin composition of the present invention comprises 1 to 99% by weight of the EVOH resin composition (F) and 1 to 99% by weight of the modified EVOH (G3). In this embodiment, the resin composition preferably comprises 50 to 99% by weight of the EVOH resin composition (F) and 1 to 50% by weight of the modified EVOH (G3). In other words, it is desirable that the unmodified EVOH resin composition (F) be a major component and the modified EVOH (G3) be a minor component. This makes it possible to impart flexibility and secondary processability to the resin composition without causing a serious damage in gas barrier properties inherent in the EVOH resin composition (F). In addition, an economic benefit can also be enjoyed because the modified EVOH (G3) requires more production cost than the unmodified EVOH resin composition (F) does. The content of the modified EVOH (G3) is more desirably 5% by weight or more, and still more desirably 10% by weight or more. The content of the EVOH resin composition (F) is more desirably 95% by weight or less, and still more desirably 90% by weight or less. On the other hand, the content of the modified EVOH (G3) is more desirably 40% by weight or less, and still more desirably 30% by weight or less. The content of the EVOH resin composition (F) is more desirably 60% by weight or more, and still more desirably 70% by weight or more.

To the resin composition of the present invention, various additives such as antioxidant, color agent, UV absorber, slipping agent, antistatic agent, plasticizer, crosslinking agent such as boric acid, inorganic filler and inorganic desiccant, and various resin such as superabsorbent polymer may be incorporated unless the effect obtained by the present invention is adversely affected.

The blending method for obtaining the resin composition of the present invention by melt kneading the EVOH resin composition (F), the thermoplastic resin (G) and, in some cases, the aforementioned additives is not particularly restricted and any known method may be used. For example, a ribbon blender, a high-speed mixer-cokneader, a pelletizer, mixing rolls, an extruder and an intensive mixer can be used. Particularly, in view of simplicity and necessary cost of a process, preferred are melt kneading methods using a single or twin screw extruder (corotating or counterrotating), an intensive mixer, or a continuous intensive mixer. The kneading temperature is chosen appropriately depending upon the characteristics of the facility, the molecular weights and blending proportions of the resins, etc. In many cases, it is preferably within the range of from 150 to 300° C. In order to prevent oxidization of a resulting resin composition, it is preferable that the hopper be sealed with nitrogen gas and that the extrusion be conducted at low temperature. A longer kneading time will lead to a better result, but a kneading time of from 0.1 to 20 minutes is preferable in view of prevention of oxidization of a resin composition and production efficiency.

The thus obtained resin composition of the present invention is molded through melt molding into various types of molded articles such as films, sheets, containers, pipes and fibers. As a method for melt molding, extrusion molding, inflation extrusion, blow molding, injection molding, melt spinning and the like can be used. The melting temperature, which varies along with the melting point of the copolymer, is preferably about 150 to about 270° C. In an available procedure, the resin composition of the present invention is pelletized and then subjected to molding. In another available procedure, the EVOH resin composition (F) and the thermoplastic resin (G) are dry blended and then subjected directly to molding. It is also possible for these molded articles to be pulverized for the purpose of recycle and then be molded again. In addition, it is also possible to subject a film, a sheet or fibers to secondary processing by conducting their uni- or biaxial stretching or thermoforming.

The resin composition of the present invention may be used in the form of a molded article composed of a single layer only of the resin composition. However, it is also preferable to fabricate the resin composition into a multilayer structure containing at least one layer formed of the resin composition because the resin composition exhibits a superior interlayer adhesiveness. In the case where the thermoplastic resin (G) is polyolefin (G1) or a modified EVOH (G3), the layer constitution of the multilayer structure may be, but is not limited to, X/T, T/X/T, X/Ad/T, T/Ad/X/Ad/T, T/Ad/X/T and T/Ad/T/Ad/X/T where the resin composition of the present invention, an adhesive resin and another thermoplastic resin are represented by X, Ad and T, respectively. Each of the layers shown above may be a single layer or, in some cases, may include multiple layers. When the thermoplastic resin (G) is polyamide (G2), the constitution of the multilayer structure is not limited. However, it is preferable that a layer of the resin composition of the present invention is laminated with a layer of polyolefin or polyamide. More preferably, the multilayer structure is a multilayer structure, particularly a multilayer film or a multilayer sheet, in which a layer of the resin composition of the present invention has a polyolefin layer on one side thereof and a polyamide layer on the other side thereof. Use of such a constitution makes it possible to seal a content hermetically by heat sealing and also enables the moisture absorbed in the resin composition during retort treatment to be released through the polyamide layer.

The method for producing the multilayer structure is not particularly restricted. Examples thereof include a method in which a thermoplastic resin is melt extruded on a molded article (film, sheet or the like) made of the resin composition of the present invention, a method in which the resin composition and another thermoplastic resin are coextruded on a substrate of a thermoplastic resin or the like, a method in which a thermoplastic resin and the resin composition of the present invention are coextruded or coinjected, and a method in which a molded article obtained from the resin composition of the present invention and a film or sheet made of another substrate are laminated together using a known adhesive such as organic titanium compound, an isocyanate compound, and a polyester compound.

Of these methods, the method of coextrusion or coinjection is preferred when the thermoplastic resin (G) is polyolefin (G1) or modified EVOH (G3). The method for coextrusion molding the composition of the present invention and a thermoplastic resin is not particularly restricted and preferable examples thereof include the multimanifold-merging T die method, the feedblock-merging T die method and the inflation method. The method of coinjection is not also particularly restricted and conventional methods may be employed.

When the thermoplastic resin (G) is polyolefin (G1) or a modified EVOH (G3), examples of the thermoplastic resin to be employed for lamination with the resin composition of the present invention include homopolymers or copolymers of olefins such as linear low-density polyethylene, low-density polyethylene, medium-density polyethylene, high-density polyethylene, ethylene-vinyl acetate copolymers, ethylene-propylene copolymers, polypropylene, propylene-$\alpha$-olefin copolymers ($\alpha$-olefins having 4 to 20 carbon atoms), polybutene and polypentene, polyester such as polyethylene terephthalate, polyester elastomer, polyamide resin such as nylon-6 and nylon-6,6, polystyrene, polyvinyl chloride, polyvinylidene chloride, acrylic resin, vinyl ester resin, polyurethane elastomer, polycarbonate, chlorinated polyethylene and chlorinated polypropylene. Moreover, when the thermoplastic resin (G) is polyolefin (G1), the examples also include ethylene-vinyl alcohol copolymers.

Particularly, a resin composition comprising EVOH resin composition (F) and polyolefin (G1) is preferably laminated with a polyolefin layer (PO layer) or an EVOH layer (EV layer) from the viewpoint of interlayer adhesiveness. Examples of the layer constitution used in this situation include EV/X/EV, X/EV/X, X/Ad/EV, X/Ad/EV/Ad/X, PO/EV/PO/X, PO/X/Ad/EV/Ad/X/PO, PO/X/Ad/EV and PO/X/Ad/EV/Ad/PO. In such multilayer structures, scrap of the multilayer structures may be used as a raw material of the layer of the resin composition of the present invention (the X layer).

In the case where the thermoplastic resin (G) is polyolefin (G1) or a modified EVOH (G3), an adhesive resin may be used when the resin composition of the present invention and the thermoplastic resin are laminated. As the adhesive resin to be used for such a case, an adhesive resin made of a carboxylic acid-modified polyolefin is preferred. The carboxylic acid-modified polyolefin used herein means a modified olefin-based polymer containing carboxyl groups which is obtained by bonding an ethylenically unsaturated carboxylic acid or anhydride thereof to an olefin-based polymer (via, for example, addition reaction or graft reaction). The olefin-based polymer used herein includes polyolefin such as polyethylene (low pressure, medium pressure, high pressure), linear low-density polyethylene, polypropylene and polybutene, copolymers of olefin and a comonomer copolymerizable with the olefin (e.g. vinyl ester and unsaturated carboxylic acid ester) such as ethylene-vinyl acetate copolymers and ethylene-ethyl acrylate copolymers. Among these, linear low-density polyethylene, ethylene-vinyl acetate copolymers (having vinyl acetate content of 5 to 55% by weight), ethylene-ethyl acrylate copolymers (having an ethyl acrylate content of 8 to 35% by weight) are preferable. Especially, linear low-density polyethylene and ethylene-vinyl acetate copolymers are preferable. Examples of the ethylenically unsaturated carboxylic acid or anhydride thereof include ethylenically unsaturated monocarboxylic acid and its ester, ethylenically unsaturated dicarboxylic acid, its mono- or diester and its anhydride. Among these, anhydrides of ethylenically unsaturated dicarboxylic acids are preferable. Specific examples are maleic acid, fumaric acid, itaconic acid, maleic anhydride, itaconic anhydride, monomethyl maleate, monoethyl maleate, diethyl maleate and monomethyl fumarate. Above all, maleic anhydride is preferable.

When thermoplastic (G) is polyolefin (G1) or modified EVOH (G3), the multilayer structure obtained in the way described above may be used as it is and be used as a packaging film or a container without secondary processing. Moreover, it can be subjected to secondary processing to yield various types of molded articles. Examples of the secondary processing include a method of stretching a film or a sheet uniaxially or biaxially, a method of thermoforming a film or a sheet, or a method of rolling a film or a sheet. In addition, a parison obtained by coinjection molding may be subjected to blow molding. Such molded articles can be employed suitably as packaging films and various types of food packaging containers such as deep-drawn containers, cup-shaped containers and bottles because of their good appearance, controlled generation of odor and superior interlayer adhesiveness. In addition to food packaging containers, they can be used for applications including fuel containers, fuel pipes, hot water circulation pipes for floor heating and wallpaper. Particularly when the thermoplastic resin (G) is a modified EVOH (G3), such a molded article can be suitably used as a film or sheet for thermoforming because of its superior moldability.

When the thermoplastic (G) is polyamide (G2), a molded article, particularly a multilayer structure, comprising the resin composition of the present invention is superior in gas barrier property and also has an excellent hot water resistance which conventional EVOH never exhibited. Therefore, it is useful for normal food packaging, in particular, for use as material for containers, bags, pouches to be sealed hermetically by heat sealing, lids of containers, and containers for packaging boil- or retort-sterilized foods. In addition, it is also suitable as materials for packaging items other than foods, e.g. packaging nonfood products such as drugs, agricultural chemicals, cosmetics, detergent, organic chemicals, audio parts and stationery. Moreover, multilayer packaging materials having a layer made of the resin composition of the present invention are useful as containers for boil or retort sterilization.

EXAMPLES

The present invention will be described in more detail below with reference to Examples, but the invention is not limited to the Examples. Unless otherwise specifically indicated, "%" and "part" are all by weight. In all cases, ion exchange water was used as water.

(1) Quantitative Determination of Alkali Metal Salt (A)

Pellets of dry EVOH resin composition (F) were ground by freeze grinding. The resulting ground EVOH resin composition (F) was screened through a sieve having a nominal dimension of 1 mm (in accordance with Test Sieve Standard JIS Z 8801). Into a 100-mL Erlenmeyer flask with a ground stopper, 10 g of powder of the screened EVOH resin composition (F) and 50 mL of 0.01 N aqueous HCl solution were placed. Then a cooling condenser was fitted to the flask and heat extraction were conducted under stirring at 95° C. for 10 hours. 2 mL of the resulting extraction solution was diluted with 8 mL of ion exchange water. The diluted extraction solution was quantitatively analyzed using an ion chromatography IC7000 manufactured by Yokogawa Electric Corporation. Thus, the amounts of Na ion and K ion were quantitatively determined. For the determination used were calibration curves prepared by use of aqueous sodium chloride solutions and aqueous potassium chloride solutions, respectively. Based on the thus-obtained amounts of Na ion and K ion, the amount of alkali metal salts (A) contained in dry EVOH pellets was determined in terms of metal elements.

Ion chromatography measurement conditions:
  Column: ICS-C25 manufactured by Yokogawa Electric Corporation.
  Eluant: Aqueous solution containing 5.0 mM of tartaric acid and 1.0 mM of 2,6-pyridine dicarboxylic acid.
  Measuring temperature: 40° C.
  Eluant flow rate: 1 mL/min
  Amount of sample injected: 50 μL (2) Quantitative Determination of Carboxylate Group (C1) Extracted Through an Immersion Treatment in Water at 95° C. for 10 Hsours Pellets of dry EVOH resin composition (F) were ground by freeze grinding. The resulting ground EVOH resin composition (F) was screened through a sieve having a nominal dimension of 1 mm (in accordance with Test Sieve Standard JIS Z 8801). Into a 100-mL Erlenmeyer flask with a ground stopper, 10 g of powder of the screened EVOH resin composition (F) and 50 mL of ion exchange water were placed. Then a cooling condenser was fitted to the flask and extraction were conducted under stirring at 95° C. for 10 hours. 2 mL of the resulting extraction solution was diluted with 8 mL of ion exchange water. The diluted extraction solution was quantitatively analyzed using an ion chromatography IC7000 manufactured by Yokogawa Electric Corporation, whereby the amount of carboxylate (acetate) ion was determined. Thus, the amount of carboxylate group (C1) was obtained. For the quantitative determination, a calibration curve prepared by use of aqueous acetic acid solutions was used.

Ion chromatography measurement conditions:
  Column: SCS5-252 manufactured by Yokogawa Electric Corporation.
  Eluant: 0.1% aqueous phosphoric acid solution
  Measuring temperature: 40° C.
  Eluant flow rate: 1 mL/min
  Amount of sample injected: 50 μL (3) Quantitative Determination of Carboxylate Group (C2) Extracted Through Immersion Treatment in a 0.05 N Aqueous Sodium Hydroxide Solution at 95° C. for 10 Hours Pellets of dry EVOH resin composition (F) were ground by freeze grinding. The resulting ground EVOH resin composition (F) was screened through a sieve having a nominal dimension of 1 mm (in accordance with Test Sieve Standard JIS Z 8801). Into a 100-mL Erlenmeyer flask with a ground stopper, 10 g of the screened powder of the EVOH resin composition (F) and 50 mL of 0.05 N aqueous sodium hydroxide solution were placed. Then a cooling condenser was fitted to the flask and heat extraction were conducted under stirring at 95° C. for 10 hours. A sample solution for analysis was prepared by adding 7 mL of ion exchange water to 2 mL of the resulting extraction solution to be diluted and then further adding 1 mL of 0.1N aqueous phosphoric acid solution. The amount of the carboxylate ion contained in the diluted extraction solution was quantitatively analyzed using an ion chromatography IC7000 manufactured by Yokogawa Electric Corporation, whereby the amount of carboxylate (acetate) ion was determined. Thus, the amount of carboxylate group (C2) was obtained. For the quantitative determination, used was a calibration curve prepared by use of sample solutions each prepared by adding 7 mL of ion exchange water to 2 mL of a solution obtained by dilution of acetic acid with 0.05 N aqueous sodium hydroxide solution, and further adding 1 mL of 0.1 N aqueous phosphoric acid solution.

Ion chromatography measurement conditions:
  Column: SCS5-252 manufactured by Yokogawa Electric Corporation.
  Eluant: 0.1% aqueous phosphoric acid solution
  Measuring temperature: 40° C.
  Eluant flow rate: 1 mL/min
  Amount of sample injected: 50 μL (4) Quantitative Determination of Boron Compound (B)

50 mg of pellets of dry EVOH resin composition (F) was completely burned by oxygen-flask combustion technique. The resulting combustion ash was dissolved in 10 mL of 1 mol/L aqueous nitric acid solution. Using this solution, the content of a boron compound (B) in terms of boron element was determined by high-frequency plasma emission spectrometry (by means of an ICP optical emission spectrometer IRIS AP manufactured by Jarrell Ash Corporation).

(5) Quantitative Determination of the Content (d) of Phosphoric Acid Compound (D)

In the examples, the content (d1) of a phosphoric acid compound (D) in the pellets before melt molding and the content (d2) of the phosphoric acid compound (D) in a monolayer film after the melt molding were determined.

When pellets of EVOH resin composition (F) before melt molding were measured, pellets of dry EVOH resin composition (F) was ground by freeze grinding. The resulting ground EVOH resin composition (F) was screened through a sieve having a nominal dimension of 1 mm (in accordance with Test Sieve Standard JISZ8801). Into a 100-mL Erlenmeyer flask with a ground stopper, 10 g of powder of the screened EVOH resin composition (F) and 50 mL of 0.01 N aqueous HCl solution were placed. Then a cooling condenser was fitted to the flask and extraction were conducted under stirring at 95° C. for 4 hours. The resulting extraction solution was quantitatively analyzed using an ion chromatography IC7000 manufactured by Yokogawa Electric Corporation, whereby the amount of phosphate ion was determined. Thus, the amount of phosphate group (d1: μmol/g) was obtained. For the quantitative determination, a calibration curve prepared by use of aqueous sodium dihydrogen phosphate solutions was used.

In the measurement of a monolayer film after melt molding, the measurement was done in the same manner as that for a sample in the form of pellets except using 5 g of strips of the film instead of 10 g of the powder of the EVOH resin composition (F), whereby the amount of phosphate ion was determined. Thus, the amount of phosphate group (d2: μmol/g) was obtained.

Ion chromatography measurement conditions:
   Column: ICS-A23 manufactured by Yokogawa Electric Corporation.
   Eluant: Aqueous solution containing 2.5 mM of sodium carbonate and 1.0 mM of sodium hydrogencarbonate.
   Measuring temperature: 40° C.
   Amount of sample injected: 50 μL (6) Phosphorus Element Content (t)

100 mg of monolayer film after melt molding was completely burned by oxygen-flask combustion technique. The resulting combustion ash was dissolved in 10 mL of 1 mol/L aqueous nitric acid solution. Using this solution, the content (t: μmol/g) of a phosphorus element was determined by high-frequency plasma emission spectrometry (by means of an ICP optical emission spectrometer IRIS AP manufactured by Jarrell Ash Corporation).

(7) Content of the Organophosphorus Compound Extractable in Chloroform 100 g of torn pieces of melt-molded monolayer film in a size not larger than a square with sides of 5 mm were filled in an extraction thimble and 3000 ml of chloroform was charged in a flask. Using a soxhlet extractor, extraction was conducted under reflux conditions for 48 hours. Chloroform was removed from the extract to yield a residue with a rotary evaporator. The resulting residue was completely burned by oxygen-flask combustion technique. The resulting combustion ash was dissolved in 10 mL of 1 mol/L aqueous nitric acid solution. Using this solution, the content of a phosphorus element was determined by high-frequency plasma emission spectrometry (by means of an ICP optical emission spectrometer IRISAP manufactured by Jarrell Ash Corporation).

(8) Measurement of Degree of Saponification (NMR Method)

Dry EVOH pellets were ground by freeze grinding. The resulting ground EVOH was screened through a sieve having a nominal dimension of 1 mm (in accordance with Test Sieve Standard JIS Z 8801). An operation cycle composed of immersing 5 g of the sieved EVOH powder in 100 g of ion exchange water, stirring at 85° C. for 4 hours, dewatering and drying was repeated twice. The resulting washed powdery EVOH was subjected to NMR measurement under the measurement conditions shown below. The degree of saponification was then determined by the analysis method provided below.

Measurement Conditions
   Device: Superconducting nuclear magnetic resonance analyzer Lambda500 manufactured by JEOL
   Observation frequency: 500 MHz
   Solvent: DMSO-d6
   Polymer concentration: 4% by weight
   Measurement temperature: 40° C. and 95° C.
   Accumulation: 600 times
   Pulse delay time: 3.836 sec
   Sample rotation speed: 10 to 12 Hz
   Pulse width (90° pulse): 6.75 μsec Analysis Method In the measurement at 40° C., a peak of hydrogen in a water molecule appeared near 3.3 ppm. This peak overlapped a 3.1 to 3.7 ppm part of the peak of the methine hydrogens in the vinyl alcohol units of EVOH. On the other hand, in the measurement at 95° C., the overlapping occurred at 40° C. was eliminated, but a peak existing near 4 to 4.5 ppm of the hydrogens in the hydroxyl groups in vinyl alcohol units of EVOH overlapped a 3.7 to 4 ppm part of the peak of the methine hydrogens in vinyl alcohol units of EVOH. In the determination of the quantity of the methine hydrogens (3.1 to 4 ppm) in the vinyl alcohol units of EVOH, data measured at 95° C. were adopted for the region of 3.1 to 3.7 ppm and data measured at 40° C. were adopted for the region of 3.7 to 4 ppm for the purpose of avoidance of overlap with the peaks of the hydrogen of water or a hydroxyl group. Thus, the total amount of the methine hydrogens is quantitatively determined as the sum of those data. It is known that the peak of hydrogen of water or a hydroxyl group shifts toward higher magnetic fields with increase in measurement temperature.

Therefore, analysis was done by use of both measurements at 40° C. and 95° C. in the following manner. An integral ($I_1$) of the peaks at a chemical shift of 3.7 to 4 ppm and an integral ($I_2$) of the peaks at a chemical shift of 0.6 to 1.8 ppm are determined from the spectrum measured at 40° C. An integral ($I_3$) of the peaks at a chemical shift of 3.1 to 3.7 ppm, an integral ($I_4$) of the peaks at a chemical shift of 0.6 to 1.8 ppm, and an integral ($I_5$) of the peaks at a chemical shift of 1.9 to 2.1 ppm are determined from the spectrum measured at 95° C. The peak of a chemical shift of 0.6 to 1.8 ppm derives mainly from methylene hydrogens, whereas the peak of a chemical shift of 1.9 to 2.1 ppm derives from methyl hydrogens in the units of unsaponified vinyl acetate. Based on these integral values, a degree of saponification was calculated according to the following formula:

$$\text{Degree of saponification} = \frac{(I_1/I_2 + I_3/I_4) \times 100}{(I_1/I_2 + I_3/I_4) + (I_5/I_4)/3}$$

(9) Intrinsic Viscosity 0.20 g of dry EVOH pellet for use as a sample was weighed precisely and then dissolved in 40 mL of hydrous phenol (water/phenol=15/85% by weight) by heating at 60° C. for 4 hours. Measurement was conducted (t0=90 sec) at a temperature of 30° C. using an Ostwald viscometer and an intrinsic (limiting) viscosity [η] was calculated from the following formula:

$$[\eta] = (2 \times (\eta sp - \ln \eta rel))^{1/2}/C \ (L/g)$$

$\eta sp = t/t0 - 1$ (specific viscosity)

$\eta rel = t/t0$ (relative viscosity)

C: EVOH concentration (g/L)

t0: time which a blank (hydrous phenol) required to pass the viscometer t: time which hydrous phenol solution containing a sample dissolved therein required to pass the viscometer

(10) Measurement of Water Content of Hydrous EVOH Pellets

The water content of EVOH pellets were measured under conditions including a drying temperature of 180° C., a drying time of 20 minutes and a sample weight of about 10 g by means of a halogen moisture analyzer HR73 manufactured by METTLER.

(11) Measurement of Carbon Dioxide Gas Concentration

Using a portable pH and ion meter IM-22P manufactured by DKK-TOA Corp. connected to a carbon dioxide gas sensor (CE-2041), the carbon dioxide gas concentration in a solution was measured.

(12) Monolayer Film Formation Test

Pellets of a dry EVOH resin composition (F) were subjected to a monolayer film formation under the following conditions using a 20 mm extruder D2020 manufactured by Toyo Seiki Seisaku-Sho, Ltd. (D (mm)=20, L/D=20, compression ratio=2.0, screw: fullflight) to obtain a mololayer film.

Extrusion temperature: C1/C2/C3/Die=175/200/220/220° C.

Screw rotation speed: 40 rpm

Discharge rate: 1.3 kg/hr

Drawing roll temperature: 80° C.

Drawing roll speed: 3.1 m/min

Film thickness: 20 µm (12-a) Yellowing Resistance

A monolayer film prepared in the method described above was wound up around a paper board tube and it was checked visually for the degree of yellowing at its edge according to the following criteria.

Rating: Criterion
  A: No yellowing
  B: A little yellowing
  C: Yellowing (12-b) 72-Hr Long-Run Workability A film passed for 72 hours since the beginning of the monolayer film formation was sampled and the number of gel-like hard spots (having a visually recognizable size of about 100 µm or more) was counted.

The number of hard spots was converted into a number per 1.0 m$^2$ and was judged as follows.

Rating: Criterion
  A: Less than 20 hard spots
  B: Not less than 20 but less than 40 hard spots
  C: Not less than 40 but less than 60 hard spots
  D: 60 or more hard spots (12-C) 120-Hr Long-Run Workability A film passed for 120 hours since the beginning of the monolayer film formation was sampled and the number of gel-like hard spots (having a visually recognizable size of about 100 µm or more) was counted.

The number of hard spots was converted into a number per 1.0 m$^2$ and was judged as follows.

Rating: Criterion
  A: Less than 20 hard spots
  B: Not less than 20 but less than 40 hard spots
  C: Not less than 40 but less than 60 hard spots
  D: 60 or more hard spots

(13) Evaluation of High-Temperature Yellowing

A 2-mm thick disc-shaped sample was prepared by heat melting 5 g of pellets of a dry EVOH resin composition (F) by a heat compression press machine at 250° C. for 2 minutes. The sample was visually evaluated for its hue according to the following criteria.

Rating: Criterion
  A: Almost not yellowed.
  B: Slightly yellowed.
  C: Yellowed.

(14) Odor Test 10 g of pellets of dry EVOH resin composition (F) and 10 mL of ion exchange water were put in a 100-mL glass screw pipe, which was sealed with a lid. Then the screw pipe was placed in a safe vent dryer (dryer) at 90° C. and heat extraction was conducted for 15 hours. Subsequently, the screw pipe was left stand at room temperature for 30 minutes to be cooled. After the cooling, the lid of the screw pipe was removed and the resulting extraction solution was evaluated for its odor by five monitors according to the following criteria.

Rating: Criterion
  A: No smell.
  B: Slight smell.
  C: Smell

(15) Adhesive Strength Test

Using pellets of a dry EVOH resin composition (F), a linear low density polyethylene (LLDPE; manufactured by Mitsui Chemicals, Inc., Ultzex 2022L), and an adhesive resin (Tie; Bondine TX8030 manufactured by Sumika Atochem Co., Ltd.), a three-kind five-layer multilayer film (LLDPE/Tie/EVOH/Tie/LLDPE=50 µ/10 µ/10 µ/10 µ/50 µ) was obtained in the method described below.

Specifications of the extruder and the T die used in this test are as follows:

Extruder:
  for EVOH: 20φ extruder for laboratory use ME CO-EXT (manufactured by Toyo Seiki Seisaku-Sho Ltd.)
  for Tie: 25φ extruder P25-18AC (manufactured by Osaka Seiki)
  for LLDPE: 32φ extruder GF-32-A (manufactured by Research Laboratory of Plastics Technology Co., Ltd.)

EVOH Extrusion Temperature:

C1/C2/C3/die=175/210/220/220° C.

Tie Extrusion Temperature:

C1/C2/C3/die=100/160/220/220° C.

LLDPE Extrusion Temperature:

C1/C2/C3/die=150/200/210/220° C.

T die: 300 mm wide coat hunger die (manufactured by Research Laboratory of Plastics Technology Co., Ltd.)

(15-a) Adhesive Strength Just After Film Formation

The multilayer film obtained was cut into a size 150 mm along the MD and 10 mm along the TD just after the multilayer film formation and immediately was subjected to T type peel strength measurement by means of an Autograph (DCS-50M, manufactured by Shimadzu Corp.). In the measurement, the interlayer adhesive strength between the Tie located on the chill roll side and the EVOH in the multilayer film was measured.

(15-b) Adhesive Strength After a Lapse of One Week Since the Film Formation

The above-prepared sample of a multilayer film of 150 mm long and 10 mm wide was left stand for one week in a constant temperature and humidity room controlled at 23° C.-50% RH. In the steady temperature and humidity room controlled at 23° C.-50% RH, the T type peel strength measurement was carried out using the foregoing sample by means of an Autograph (DCS-50M, manufactured by Shimadzu Corp.). In the measurement, the interlayer adhesive strength between the Tie located on the chill roll side and the EVOH in the multilayer was measured.

Example 1

[Preparation of EVOH Resin Composition (F)]

Into a saponification reactor having a capacity of 470 L, 50 kg of a 45% methanol solution of an ethylene-vinyl acetate copolymer having an ethylene content of 32 mol % and 129 kg of methanol were charged and the internal temperature was adjusted to 60° C. while nitrogen gas is blown into the reactor. 29 L of a sodium hydroxide solution (concentration: 80 g/L) in methanol was added thereto and saponification reaction was started. During the saponification reaction, nitrogen gas was blown continuously into the reactor in order to exhaust methyl acetate formed in the reaction system as a by-product out of the reaction system together with the methanol in the reaction system for the purpose of improving the reaction efficiency. The exhaustion rate was about 20 kg/hr in total of methyl acetate and methanol. The exhaust was condensed in a cooling condenser to be recovered. After a lapse of two hours since the start of the reaction, 29 L of a sodium hydroxide solution (concentration: 80 g/L) in methanol was further added to finish up the saponification reaction. After a lapse of six hours since the reaction was started, 6.8 kg of acetic acid and 56 L of water were added to neutralize the reaction solution, thereby stopping the reaction.

The reaction solution neutralized was transferred from the reactor into a drum. It was left stand at room temperature for 16 hours to be cooled and solidified into cake form. Then, the cake-form resin was dewatered by use of a centrifuge (H-130 manufactured by KOKUSAN Corporation, rotation speed 1200 rpm). Subsequently, a step of washing the resin with water by continuously supplying ion exchange water to the central portion of the centrifuge from above and simultaneously dewatering was done for 10 hours. The wash obtained after a lapse of 10 hours since the beginning of the washing had a conductivity of 30 µS/cm (measured by CM-30ET manufactured by DKK-TOA Corporation).

The granular EVOH obtained in this way was dried at 60° C. for 48 hours using a drier. 20 kg of the dried granular EVOH was dissolved in 43 L of water/methanol mixed solution (weight ratio: water/methanol=4/6) at 80° C. for 12 hours under stirring. Then, the stirring was stopped and the temperature in the dissolution vessel was dropped to 65° C. By leaving for five hours, the EVOH solution in water/methanol was degassed. The solution was extruded into a water/methanol mixed solution (weight ratio: water/methanol=9/1) at 5° C. through a metal plate having a circular opening of 3.5 mm in diameter to form a strand-like solid, which was cut to yield pellets about 4 mm in diameter and about 5 mm in length.

An operation composed of charging 2.4 kg of the thus obtained hydrous pellets and 24 L of ion exchange water in a plastic container having a height of 400 mm and an opening diameter of 370 mm, washing at 25° C. for two hours while stirring, and then dewatering was repeated twice. Then, an operation composed of adding 24 L of a 1 g/L aqueous acetic acid solution to 2.4 kg of the hydrous pellets, washing at 25° C. for two hours while stirring and then dewatering was repeated twice. Moreover, an operation composed of adding 24 L of ion exchange water to 2.4 kg of the hydrous pellets, washing at 25° C. for two hours while stirring and then dewatering was repeated six times. The wash obtained after the sixth washing was measured for its conductivity using a CM-30ET manufactured by DKK-TOA Corporation. As a result, the wash had a conductivity of 3 µS/cm. The water content of the resulting EVOH pellets was 50% by weight.

Into a plastic container having a height of 300 mm and an opening diameter of 280 mm, 2.4 kg of the thus obtained hydrous pellets of washed EVOH (ethylene content: 32 mol %, degree of saponification: 99.98 mol % or more (calculated by NMR), intrinsic viscosity: 0.085 L/g) and 5.1 L of an aqueous boric acid solution having a concentration of 0.36 g/L. Then, immersion was done at 25° C. for 10 hours and thereafter the pellets were dewatered.

Next, 24 L of ion exchange water was charged into a plastic container having a height of 400 mm and an opening diameter of 370 mm. Five silicone tubes (inner diameter: 7 mm; outer diameter: 10 mm) were inserted into the ion exchange water contained in the container and carbon dioxide gas was blown thereinto for 2 hours by bubbling at a rate of 5 L/min. The carbon dioxide gas was fed by use of a carbon dioxide gas cylinder (30 kg of liquefied carbon dioxide gas manufactured by Nippon Tansan Co., Ltd.) and a flow meter (Model RK-1600R manufactured by Kojima Instruments Inc.). In the water into which carbon dioxide gas was blown, 1.68 g of boric acid, 6.48 g of dipotassium hydrogenphosphate and 1.20 g of phosphoric acid were dissolved and blowing of carbon dioxide gas was continued for another one hour at a rate of 5 L/min. The treatment solution had a boric acid content of 0.07 g/L, a dipotassium hydrogen phosphate content of 0.27 g/L, and a phosphoric acid content of 0.05 g/L. The pH of the treatment solution after a 1-hour blowing of carbon dioxide gas was measured using a pH meter (MA235 manufactured by METTLER). The treatment solution had a pH of 4.9.

While the blowing of carbon dioxide gas at a blowing rate of 5 L/min was continued, 2.4 kg of the hydrous pellets were charged into the treatment solution and were subjected to immersion and stirring at 25° C. for six hours. During the period ranging from the beginning of the treatment to the end of the treatment, the pH of the treatment solution was measured at every one-hour interval. The pH of the treatment solution was kept at 4.9 at all measurements with no fluctuations. The carbon dioxide gas concentration in the treatment solution was analyzed to be 20 mmol/L. After a 6-hour immersion and stirring in the treatment solution, the resulting pellets were dewatered immediately and then were subjected to hot-air drying at 80° C. for three hours and successively at 107° C. for 24 hours, yielding pellets of a dry EVOH resin composition (F) (water content: 0.2% by weight).

The alkali metal salt (A) contained in the resulting pellets of the dry EVOH resin composition (F) was potassium and the content of the alkali metal salt (A) was 3.40 µmol/g in terms of metal element. The content (d1) of the phosphoric acid compound (D) was 1.2 µmol/g in terms of phosphate group. The content of a boron compound (B) in the resulting pellets of the dry EVOH resin composition (F) was 143 ppm (13 µmol/g) in terms of boron element. The amount of the carboxylate group (C1) extracted through an immersion treatment of the pellets of the dry EVOH resin composition (F) in pure water at 95° C. for 10 hours was 0 ppm (0 µmol/g). The amount of the carboxylate (acetate) group (C2) extracted through an immersion treatment in a 0.05 N aqueous sodium hydroxide solution at 95° C. for 10 hours was 36 ppm (0.6 µmol/g). The MFR of the pellets of the dry EVOH resin composition (F) was 1.6 g/10 min (at 190° C. under a load of 2160 g).

Using the resulting pellets of the dry EVOH resin composition (F), a monolayer film was prepared and then tests of yellowing resistance and long-run workability were conducted in the procedures described previously. The yellowing resistance, 72-hour long-run workability and 120-hour long-run workability of the EVOH resin composition (F) of this example were all evaluated as being A. The monolayer film had a content (d2) of the phosphoric acid compound (D) of 0.10 µmol/g in terms of phosphate group and a phosphorus element content (t) of 1.2 µmol/g. The content of the organo-phosphorus compound extractable in chloroform was less than 0.01 µmol/g.

Using the resulting pellets of the dry EVOH resin composition (F), a high-temperature yellowing property test was conducted in the procedure described previously, resulting in an A rating. Moreover, using the dry EVOH pellets, a odor test was conducted in the procedure described previously. None of the five monitors perceived a smell and therefore an A rating was provided.

Furthermore, using the resulting pellets of the dry EVOH resin composition (F), an adhesive strength test was conducted in the procedure described previously. The adhesive strength immediately after the film formation was 760 g/15 mm and that after a lapse of one week since the film formation was 900 g/15 mm. In both measurements, favorable adhesive strengths were obtained.

[Production of a Film Comprising the Resin Composition of the Present Invention]

The pellets of the EVOH resin composition (F) and a polyethylene (G1) ("Ultzex 2022L" manufactured by Mitsui Chemicals, Inc., Melt Flow Index (measured under a load of 2160 g at 190° C.)=2.1 g/10 min) were dry blended at a weight ratio of the EVOH resin composition (F) to the polyethylene (G1) of 8:92. Then, the mixture was fed to an extruder equipped with a fullflight screw having a diameter of 40 mm, an L/D of 24 and a compression ratio of 3.8, and a film formation was conducted using a flat die having a width of 550 mm. The film formation temperature was set to 190 to 230° C. for the extruder and to 220° C. for the die. A film of 50 µm in thickness was winded by means of a drawing machine. Thus, a six-hour continuous film formation operation was conducted. The resulting film was evaluated for the condition of its surface, its hue and its adhesion to a die after film formation.

As a result, the film made of the resin composition obtained had surfaces which were uniform and even. There were no practical problems with the film caused by foreign substances such as fish eyes. In addition, no yellowing was recognized in the film. Moreover, the amount of EVOH resin adhered near the die in the extruder after the film formation was within a practically usable range.

Example 2

[Preparation of EVOH Resin Composition (F)]

Into a saponification reactor having a capacity of 470 L, 50 kg of a 45% methanol solution of an ethylene-vinyl acetate copolymer having an ethylene content of 27 mol % and 129 kg of methanol were charged and the internal temperature was adjusted to 60° C. while nitrogen gas is blown into the reactor. 29 L of a sodium hydroxide solution (concentration: 80 g/L) in methanol was added thereto and saponification reaction was started. During the saponification reaction, nitrogen gas was blown continuously into the reactor in order to exhaust methyl acetate formed in the reaction system as a by-product out of the reaction system together with the methanol in the reaction system for the purpose of improving the reaction efficiency. The exhaustion rate was about 20 kg/hr in total of methyl acetate and methanol. The exhaust was condensed in a cooling condenser to be recovered. After a lapse of two hours since the start of the reaction, 29 L of a sodium hydroxide solution (concentration: 80 g/L) in methanol was further added to finish up the saponification reaction. After a lapse of six hours since the reaction was started, 6.8 kg of acetic acid and 56 L of water were added to neutralize the reaction solution, thereby stopping the reaction.

The reaction solution neutralized was transferred from the reactor into a drum. It was left stand at room temperature for 16 hours to be cooled and solidified into cake form. Then, the cake-form resin was dewatered by use of a centrifuge (H-130 manufactured by KOKUSAN Corporation, rotation speed 1200 rpm). Subsequently, a step of washing the resin with water by continuously supplying ion exchange water to the central portion of the centrifuge from above and simultaneously dewatering was done for 10 hours. The wash obtained after a lapse of 10 hours since the beginning of the washing had a conductivity of 30 µS/cm (measured by CM-30ET manufactured by DKK-TOA Corporation).

The granular EVOH obtained in this way was dried at 60° C. for 48 hours using a drier. 20 kg of the dried granular EVOH was dissolved in 43 L of water/methanol mixed solution (weight ratio: water/methanol=5/5) at 80° C. for 12 hours under stirring. Then, the stirring was stopped and the temperature in the dissolution vessel was dropped to 65° C. By leaving for five hours, the EVOH solution in water/methanol was degassed. The solution was extruded into a water/methanol mixed solution (weight ratio: water/methanol=9/1) at 5° C. through a metal plate having a circular opening of 3.5 mm in diameter to form a strand-like solid, which was cut to yield pellets of about 4 mm in diameter and about 5 mm in length.

An operation composed of charging 2.4 kg of the thus obtained hydrous pellets and 24 L of ion exchange water in a plastic container having a height of 400 mm and an opening diameter of 370 mm, washing at 25° C. for two hours while stirring, and then dewatering was repeated twice. Then, an operation composed of adding 24 L of a 1 g/L aqueous acetic acid solution to 2.4 kg of the hydrous pellets, washing at 25° C. for two hours while stirring and then dewatering was repeated twice. Moreover, an operation composed of adding 24 L of ion exchange water to 2.4 kg of the hydrous pellets, washing at 25° C. for two hours while stirring and then dewatering was repeated six times. The wash obtained after the sixth washing was measured for its conductivity using a CM-30ET manufactured by DKK-TOA Corporation. As a result, the wash had a conductivity of 3 µS/cm. The water content of the resulting EVOH pellets was 50% by weight.

Into a plastic container having a height of 300 mm and an opening diameter of 280 mm, 2.4 kg of the thus obtained water-containing pellets of washed EVOH (ethylene content: 27 mol %, degree of saponification: 99.98 mol % or more (calculated by NMR), intrinsic viscosity: 0.094 L/g) and 5 L of an aqueous boric acid solution having a concentration of 0.30 g/L were charged. Then, immersion was done at 25° C. for 10 hours and thereafter the pellets were dewatered.

Next, 5 L of ion exchange water was charged into a plastic container having a height of 300 mm and an opening diameter of 280 mm. A silicone tube (inner diameter: 7 mm; outer diameter: 10 mm) was inserted into the ion exchange water contained in the container and carbon dioxide gas was blown thereinto for 0.5 hour by bubbling at a rate of 1 L/min. The carbon dioxide gas was fed by use of a carbon dioxide gas cylinder (30 kg of liquefied carbon dioxide gas manufactured by Nippon Tansan Co., Ltd.) and a flow meter (Model RK-1600R manufactured by Kojima Instruments Inc.). In the water into which carbon dioxide gas was blown, 0.35 g of boric acid, 0.65 g of potassium hydrogencarbonate and 0.85 g of potassium dihydrogenphosphate were dissolved and blowing of carbon dioxide gas was continued for another one hour at a rate of 1 L/min. The treatment solution had a boric acid content of 0.07 g/L, a potassium hydrogencarbonate content of 0.13 g/L, and a potassium dihydrogenphosphate content of 0.17 g/L. The pH of the treatment solution after a 1-hour blowing of carbon dioxide gas was measured using a pH meter (MA235 manufactured by METTLER. The treatment solution had a pH of 5.0.

While the blowing of carbon dioxide gas at a blowing rate of 1 L/min was continued, 2.4 kg of the hydrous pellets were charged into the treatment solution and were subjected to immersion and stirring at 25° C. for six hours. During the period ranging from the beginning of the treatment to the end of the treatment, the pH of the treatment solution was measured at every one-hour interval. The pH of the treatment solution was kept at 5 at all measurements with no fluctuations. The carbon dioxide gas concentration in the treatment solution was analyzed to be 20 mmol/L. After a 6-hour immersion and stirring in the treatment solution, the resulting pellets were dewatered immediately and then were subjected to hot-air drying at 80° C. for three hours and successively at 107° C. for 24 hours, yielding pellets of a dry EVOH resin composition (F) (water content: 0.2% by weight).

The alkali metal salt (A) contained in the resulting pellets of the dry EVOH resin composition (F) was potassium and the content of the alkali metal salt (A) was 2.6 µmol/g in terms of metal element. The content (d1) of phosphoric acid compound (D) was 0.4 µmol/g in terms of phosphate group. The content of a boron compound (B) in the resulting pellets of the dry EVOH resin composition (F) was 160 ppm (15 µmol/g) in terms of boron element. The amount of the carboxylate group (C1) extracted through an immersion treatment of pellets of the dry EVOH resin composition (F) in pure water at 95° C. for 10 hours was 0 ppm (0 µmol/g). The amount of the carboxylate (acetate) group (C2) extracted through an immersion treatment in a 0.05 N aqueous sodium hydroxide solution at 95° C. for 10 hours was 35 ppm (0.6 µmol/g). The MFR of the pellets of the dry EVOH resin composition (F) was 4.0 g/10 min (at 210° C. under a load of 2160 g).

Using the resulting pellets of the dry EVOH resin composition (F), a monolayer film was prepared and then tests of yellowing resistance and long-run workability were conducted in the procedures described previously. The yellowing resistance, the 72-hour long-run workability and the 120-hour long-run workability of the EVOH resin composition (F) of this example were evaluated as being B, A and B, respectively. The monolayer film had a content (d2) of the phosphoric acid compound (D) of 0.02 µmol/g in terms of phosphate group and a phosphorus element content (t) of 0.4 µmol/g. In addition, the content of organophosphorus compounds extractable in chloroform was less than 0.01 µmol/g.

Using the above-mentioned pellets of the dry EVOH resin composition (F), a high-temperature yellowing property evaluation test was conducted according to the procedure described previously, resulting in a B rating. Moreover, using the dry EVOH pellets obtained, a odor test was conducted in the procedure described previously. None of the five monitors perceived a smell and therefore an A rating was provided.

Furthermore, using the resulting pellets of the dry EVOH resin composition (F), an adhesive strength test was conducted according to the procedure described previously. The adhesive strength immediately after the film formation was 800 g/15 mm and that after a lapse of one week since the film formation was 950 g/15 mm. In both measurements, favorable adhesive strengths were obtained.

[Production of Polyamide (G2)]

Into a 30-L pressure reactor, 10 kg of ε-caprolactam as a monomer, 82 g of 1,6-hexanediamine as a molecular weight regulator, and 1.0 kg of water were charged. The resulting mixture was heated to 260° C. under stirring and the pressure was elevated to 0.5 MPa. Then, the pressure was reduced to normal pressure and a polymerization was conducted at 260° C. for 3 hours. At the time when the polymerization completed, the reaction product was discharged into a strand form. It was cooled to solidify and then cut into pellets. The pellets obtained were washed with hot water at 95° C. and then dried to yield polyamide. This resin had a relative viscosity of 2.7, a terminal amino group content of 81 µeq/g, a terminal carboxylic acid content of 16 µeq/g. The proportion of the terminal amino groups was 84%.

To 5 kg of the thus obtained polyamide, 80 g of phthalic anhydride as a terminal capping agent was dry blended. The blend was mixed to react at 260° C. using a twin screw extruder, and then was discharged into a strand form and cut. Thus, polyamide (G2) in a pellet form was obtained. This resin had a relative viscosity of 2.6. The terminal amino group content, the terminal carboxylic acid content and the terminal phthalimide structure content were 4 µeq/g, 20 µeq/g and 77 µeq/g, respectively. The proportion of the terminal imide structures was 76%.

[Production of a Film Comprising the Resin Composition of the Present Invention]

70 parts by weight of the EVOH resin composition (F) and 30 parts by weight of the polyamide (G2) were dry blended. Then, the mixture was fed to an extruder equipped with a fullflight screw having a diameter of 40 mm, an L/D of 24 and a compression ratio of 3.8 while a hopper portion was purged with nitrogen gas. A film formation was conducted using a flat die having a width of 550 mm. The film formation temperature was set to 190 to 240° C. for the extruder and to 225° C. for the die. A film of 15 µm in thickness was winded by means of a drawing machine. Thus, a 24-hour continuous film formation operation was conducted. After a lapse of 24 hours, the resulting film was subjected to a film surface judgment, an appearance judgment after hot water treatment (the judgment method is described below) and a judgment of adhesion to a die after film formation.

The film made of the resin composition obtained according to the present invention had surfaces which were uniform and even. There were no practical problems with the film caused by foreign substances such as fish eyes. Even after the hot water treatment, no delamination between the intermediate layer and the inner or outer layer was recognized and, therefore, a good adhesiveness was exhibited. Moreover, the amount of EVOH adhered near the die portion in the extruder after the film formation was within a practically usable range.

[Appearance Judgment After Hot Water Treatment]

To the resulting film as an intermediate layer, a biaxially oriented nylon 6 film ("Emblem" manufactured by Unitika Ltd., 15 µm thick) as an outer layer, and a non-oriented polypropylene film ("RXC-7" manufactured by Tohcello Co., Ltd., 60 µm thick) as an inner layer, an adhesive for dry lamination (two-component type, urethane base) "Takenate A-385/A-5" manufactured by Takeda Chemical Industries, Ltd. was applied in a solid amount of 4 g/m². After the solvent was evaporated at 80° C., the films were laminated to each other and then aged at 40° C. for five days to yield a multilayer film. From this film, a bag with three heat-sealed sides was prepared. A mixture of water and commercially available edible salad oil (volume ratio: 90/10) was filled into the bag and the remaining side thereof was heat-sealed up. Subsequently, using a retort sterilizer (a high temperature-high pressure cooking and sterilizing test machine "RCS-40RTGN" manufactured by Hisaka Works, Ltd.), a hot water treatment was conducted at 100° C. for 30 minutes. After the hot water treatment, the sample was stored in a room conditioned at 20° C. and 65% RH for one day and then judged for its appearance.

Example 3

[Production of Modified EVOH (G3)]

A modified EVOH (G3) was produced according to a method described below. The analysis of the starting EVOH and the resulting EVOH (G3) was conducted according to the methods disclosed in a pamphlet of International Publication No. WO 02/092643.

28 parts by weight of zinc acetylacetonate monohydrate was mixed with 957 parts by weight of 1,2-dimethoxyethane to yield a mixed solution. To the resulting mixed solution, 15 parts by weight of trifluoromethane sulfonic acid was added under stirring to yield a catalyst solution. In other words, prepared was a solution resulting from mixing 1 mol of trifluoromethane sulfonic acid per 1 mol of zinc acetylacetonato monohydrate.

Pellets of an EVOH which had an ethylene content of 44 mol %, a degree of saponification of 99.8%, an intrinsic viscosity of 0.096 L/g, an MFR of 5 g/10 min (at 190° C. under a load of 2160 g), an acetic acid content of 53 ppm, a sodium content of 1 ppm (in terms of metal element), a potassium content of 8 ppm (in terms of metal element) and a phosphorus compound content of 20 ppm (in terms of phosphate) was used as a starting EVOH. Moreover, epoxypropane was used as a monofunctional epoxy compound having a molecular weight of not more than 500.

Figure 2:
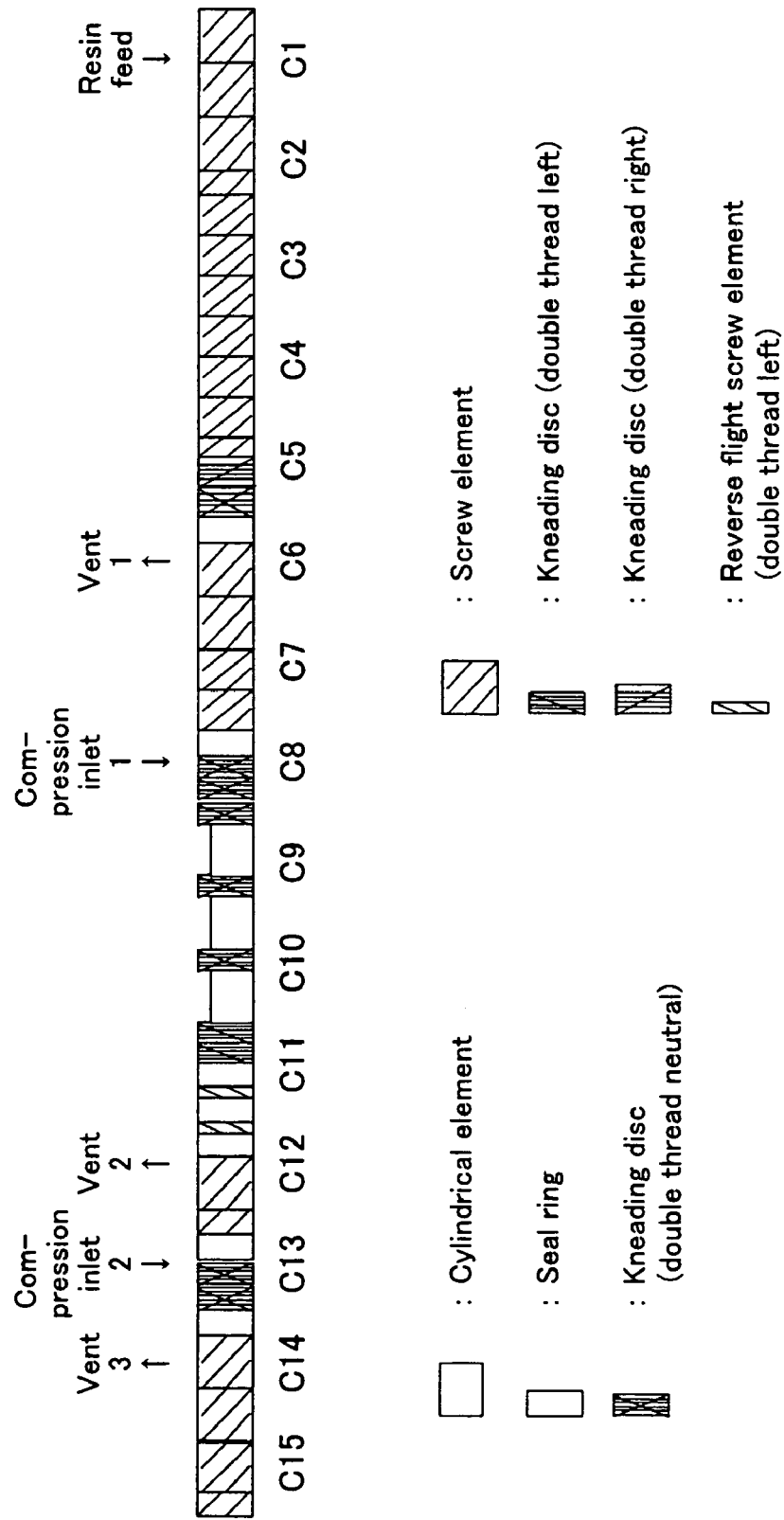
FIG. 2 is a schematic view of the constitution of the extruder used for the production of the modified EVOH (G3) in Example 3.

Using a TEM-35BS extruder (37 mmφ, L/D=52.5) manufactured by Toshiba Machine Co., Ltd., a screw constitution, vents and compression inlets were arranged as shown in FIG. 2. Barrel C1 was cooled with water and barrels C2-C15 were set at 220° C. The extruder was driven at a screw speed of 250 rpm. The starting EVOH was added at a rate of 11 kg/hr from a resin feed opening of C1 and the inner pressure of vent 1 was reduced to 60 mmHg. From compression inlet 1 of C8, epoxypropane and the afore-mentioned catalyst solution were fed after they were mixed so that the epoxypropane and the catalyst solution were added at rates of 2.0 kg/hr and 0.22 kg/hr, respectively (pressure during the feed: 3 MPa). Subsequently, unreacted epoxypropane was removed through vent 2 under normal pressure and then a 8.2% by weight aqueous solution of trisodium ethylene diamine tetraacetate trihydrate as a catalyst deactivator was added at a rate of 0.11 kg/hr from compression inlet 2 of C13.

The mixing ratio of the monofunctional epoxy compound in the above-mentioned melt-kneading operation was 18.3 parts by weight for 100 parts by weight of the starting EVOH. The catalyst was added in an amount of 2 μmol/g in molar number of metal ions relative to the weight of the starting EVOH. The ratio of the molar number of the catalyst deactivator to the molar number of the metal ions contained in the catalyst solution was 1:1.

The inner pressure at vent 3 was reduced to 20 mmHg to remove the moisture. Thus, a modified EVOH (G3) was obtained. The resulting modified EVOH (G) had an MFR of 5 g/10 min (at 190° C. under a load of 2160 g) and a melting point of 105° C. In addition, the zinc ion content was 120 ppm (1.9 μmol/g) and the alkali metal salt content in terms of metal elements was 138 ppm (5.9 μmol/g) [sodium: 130 ppm (5.7 μmol/g); potassium: 8 ppm (0.2 μmol/g)]. The trifluoromethanesulfonate ion content was 280 ppm (1.9 μmol/g). The content of alkali metal ion was 3.1 times (molar ratio) the content of trifluoromethanesulfonate ion. The thus obtained modified EVOH (G3) had an ethylene content of 44 mol % and a structural unit (I) content of 8 mol %.

[Preparation of Resin Composition of the Present Invention]

70 parts by weight of EVOH resin composition (F) the same as that prepared in Example 1 and 30 parts by weight of the above-mentioned modified EVOH (G3) were dry blended in advance and then subjected to extrusion under the following conditions. The resulting molten resin strand was cooled in water and cut with a pelletizer, thereby being shaped into a pellet form. The pellets were hot air dried overnight at 100° C.

Extruder: Twin screw extruder TEX30a (L/D=42) manufactured by The Japan Steel Works, LTD.

Barrel temperature: C1/C2/C3-C12=water cooled/190/210° C.

Discharge rate: 20 kg/hr

Screw rotation speed: 300 rpm

[Thermoforming of Multilayer Film]

Using the above-mentioned resin composition of the present invention as a barrier material, a multilayer film (nylon 6 resin/barrier material/adhesive resin/LLDPE resin) was prepared under the following conditions by means of a four-kind four-layer coextrusion device. The film constitution includes 10 μm of nylon 6 resin ("Ube Nylon 1022B" manufactured by Ube Industries, Ltd.), 20 μm of barrier material, 10 μm of adhesive resin ("Admer NF500" manufactured by Mitsui Chemicals, Inc.) and 60 μm of LLDPE resin ("Ultzex 3520L" manufactured by Mitsui Chemicals, Inc.).

The coextrusion molding conditions are as follows.

Layer Constitution:

Nylon 6 resin/barrier material/adhesive resin/LLDPE resin (thickness: 10/20/10/60 in μm)

Nylon 6 resin extrusion temperature:

C1/C2/C3/C4=230/240/250/250° C.

Adhesive resin extrusion temperature:

C1/C2/C3/C4=100/170/220/220° C.

Barrier material extrusion temperature:

C1/C2/C3/C4=175/210/230/230° C.

LLDPE resin extrusion temperature:

C1/C2/C3/C4=100/170/220/220° C.

Adapter temperature: 250° C.

Die temperature: 250° C.

Specifications of extruder for each resin and T-die:
 Nylon 6 resin:
  40φ Extruder, model UT-40-H (manufactured by Research Laboratory of Plastics Technology Co., Ltd.)

Adhesive resin:
 40φ Extruder, model 10VSE-40-22 (manufactured by Osaka Seiki Co., Ltd.)
Barrier material:
 40φ Extruder, model VSVE-40-24 (manufactured by Osaka Seiki Co., Ltd.)
LLDPE resin:
 65φ Extruder, model 20VS-65-22 (manufactured by Osaka Seiki Co., Ltd.)
T-die:
 For 650-mm wide four-kind four-layer extrusion (manufactured by Research Laboratory of Plastics Technology Co., Ltd.)

Chill roll temperature: 30° C.

Drawing speed: 8 m/min

A thermoformed container was obtained by thermoforming the multilayer film obtained above so that the LLDPE forms the innermost layer of the container using a thermoforming machine (R530 manufactured by Multivac Inc.). Specifically, the multilayer film was heated at a mold temperature of 100° C. for two seconds and then was molded into the shape of a mold (a rectangular prism shape of 130 mm long, 110 mm wide and 60 mm deep) by using compressed air (pressure: 5 kgf/cm$^2$) to afford a thermoformed container.

The appearance of the resulting thermoformed container was visually observed. As a result, uniform drawing was achieved without causing unevenness or local variation in thickness and the container had a good appearance as well as a superior transparency.

[Thermoforming of a Multilayer Sheet]

Using the above-mentioned resin composition of the present invention as a barrier material, a multilayer sheet (polypropylene resin/adhesive resin/barrier material/adhesive resin/polypropylene resin) was prepared by means of a three-kind five-layer coextrusion machine. The layer constitution of the film was as follows: the inner and outer layers of the polypropylene resin ("Idemitsu Polypropylene E-203G" manufactured by Idemitsu Petrochemical Co., Ltd.) were 420 μM thick, each layer of the adhesive resin ("Admer QF551" manufactured by Mitsui Chemicals, Inc.) was 40 μm thick, and the intermediate layer of the barrier material was 80 μm thick.

The resulting multilayer sheet was thermoformed into a round cup form (mold design: upper portion 75 mmφ, lower portion 60 mmφ, depth 75 mm, draw ratio S=1.0) using compressed air (pressure: 5 kgf/cm$^2$) at a sheet temperature of 160° C. by means of a thermoforming machine (vacuum-pressure deep-drawing molding machine, model FX-0431-3, manufactured by Asano Seisakusho), thereby affording a thermoformed container.

Molding conditions are shown below.
 Heater temperature: 400° C.
 Plug: 45φ×65 mm
 Plug temperature: 150° C.
 Mold temperature: 70° C.

The appearance of the resulting cup-shaped thermoformed container was visually observed. As a result, uniform drawing was achieved without causing unevenness or local variation in thickness and the container had a good appearance as well as a superior transparency.

Referential Example 1

Into a saponification reactor having a capacity of 470 L, 50 kg of a 45% methanol solution of an ethylene-vinyl acetate copolymer having an ethylene content of 32 mol % and 129 kg of methanol were charged and the internal temperature was adjusted to 60° C. while nitrogen gas is blown into the reactor. 29 L of a sodium hydroxide solution (concentration: 80 g/L) in methanol was added thereto and saponification reaction was started. During the saponification reaction, nitrogen gas was blown continuously into the reactor in order to exhaust methyl acetate formed in the reaction system as a by-product out of the reaction system together with the methanol in the reaction system for the purpose of improving the reaction efficiency. The exhaustion rate was about 20 kg/hr in total of methyl acetate and methanol. The exhaust was condensed in a cooling condenser to be recovered. After a lapse of two hours since the start of the reaction, 29 L of a sodium hydroxide solution (concentration: 80 g/L) in methanol was further added to finish up the saponification reaction. After a lapse of six hours since the reaction was started, 6.8 kg of acetic acid and 56 L of water were added to neutralize the reaction solution, thereby stopping the reaction.

The reaction solution neutralized was transferred from the reactor into a drum. It was left stand at room temperature for 16 hours to be cooled and solidified into cake form. Then, the cake-form resin was dewatered by use of a centrifuge (H-130 manufactured by KOKUSAN Corporation, rotation speed 1200 rpm). Subsequently, a step of washing the resin with water by continuously supplying ion exchange water to the central portion of the centrifuge from above and simultaneously dewatering was done for 10 hours. The wash obtained after a lapse of 10 hours since the beginning of the washing had a conductivity of 30 μS/cm (measured by CM-30ET manufactured by DKK-TOA Corporation).

The granular EVOH obtained in this way was dried at 60° C. for 48 hours using a drier. 20 kg of the dried granular EVOH was dissolved in 43 L of water/methanol mixed solution (weight ratio: water/methanol=4/6) at 80° C. for 12 hours under stirring. Then, the stirring was stopped and the temperature in the dissolution vessel was dropped to 65° C. By leaving for five hours, the EVOH solution in water/methanol was degassed. The solution was extruded into a water/methanol mixed solution (weight ratio: water/methanol=9/1) at 5° C. through a metal plate having a circular opening of 3.5 mm in diameter to form a strand-like solid, which was cut to yield pellets of about 4 mm in diameter and about 5 mm in length.

An operation composed of charging 2.4 kg of the thus obtained hydrous pellets and 24 L of ion exchange water in a plastic container having a height of 400 mm and an opening diameter of 370 mm, washing at 25° C. for two hours while stirring, and then dewatering was repeated twice. Then, an operation composed of adding 24 L of a 1 g/L aqueous acetic acid solution to 2.4 kg of the hydrous pellets, washing at 25° C. for two hours while stirring and then dewatering was repeated twice. Moreover, an operation composed of adding 24 L of ion exchange water to 2.4 kg of the hydrous pellets, washing at 25° C. for two hours while stirring and then dewatering was repeated six times. The wash obtained after the sixth washing was measured for its conductivity using a CM-30ET manufactured by DKK-TOA Corporation. As a result, the wash had a conductivity of 3 μS/cm. The water content of the resulting EVOH pellets was 50% by weight.

Into a plastic container having a height of 300 mm and an opening diameter of 280 mm, 2.4 kg of the thus obtained hydrous pellets of washed EVOH (ethylene content: 32 mol %, degree of saponification: 99.98 mol % or more (calculated by NMR), intrinsic viscosity: 0.085 L/g) and 5.1 L of an aqueous boric acid solution having a concentration of 0.36 g/L were charged. Then, immersion was done at 25° C. for 10 hours and thereafter the pellets were dewatered.

Next, 5.1 L of ion exchange water was charged into a plastic container having a height of 300 mm and an opening diameter of 280 mm. A silicone tube (inner diameter: 7 mm; outer diameter: 10 mm) was inserted into the ion exchange water contained in the container and carbon dioxide gas was blown thereinto for 0.5 hour by bubbling at a rate of 1 L/min. The carbon dioxide gas was fed by use of a carbon dioxide gas cylinder (30 kg of liquefied carbon dioxide gas manufactured by Nippon Tansan Co., Ltd.) and a flow meter (Model RK-1600R manufactured by Kojima Instruments Inc.). In the water into which carbon dioxide gas was blown, 0.51 g of boric acid and 0.56 g of sodium carbonate were dissolved and blowing of carbon dioxide gas was continued for another one hour at a rate of 1 L/min. In the treatment solution, the content of boric acid was 0.10 g/L and the content of sodium carbonate was 0.11 g/L. The pH of the treatment solution after a 1-hour blowing of carbon dioxide gas was measured using a pH meter (MA235 manufactured by METTLER). The treatment solution had a pH of 5.1.

While the blowing of carbon dioxide gas at a blowing rate of 1 L/min was continued, 2.4 kg of the water-containing pellets were charged into the treatment solution and were subjected to immersion and stirring at 25° C. for six hours. During the period ranging from the beginning of the treatment to the end of the treatment, the pH of the treatment solution was measured at every one-hour interval. The pH of the treatment solution was kept at 5.1 at all measurements with no fluctuations. The carbon dioxide gas concentration in the treatment solution was analyzed to be 20 mmol/L. After a 6-hour immersion and stirring in the treatment solution, the resulting pellets were dewatered immediately and then were subjected to hot-air drying at 80° C. for three hours and successively at 107° C. for 24 hours, yielding pellets of a dry EVOH resin composition (F) (water content: 0.2% by weight).

The alkali metal salt (A) contained in the resulting pellets of the dry EVOH resin composition (F) was sodium and the content of the alkali metal salt (A) was 3.13 μmol/g in terms of metal element. The content of a boron compound (B) in the resulting pellets of the dry EVOH resin composition (F) was 160 ppm (15 μmol/g) in terms of boron element. The amount of the carboxylate group (C1) extracted through an immersion treatment of the pellets of the dry EVOH resin composition (F) in water at 95° C. for 10 hours was 0 ppm (0 μmol/g). The amount of the carboxylate (acetate) group (C2) extracted through an immersion treatment in a 0.05 N aqueous sodium hydroxide solution at 95° C. for 10 hours was 35 ppm (0.6 μmol/g). The MFR of the pellets of the dry EVOH resin composition (F) was 1.6 g/10 min (at 190° C. under a load of 2160 g).

Using the resulting pellets of the dry EVOH resin composition (F), a monolayer film was prepared and then tests of yellowing resistance and long-run workability were conducted in the procedures described previously. The yellowing resistance, 72-hour long-run workability and 120-hour long-run workability of the EVOH resin composition (F) of this referential example were all evaluated as being A.

Using the above-mentioned pellets of the dry EVOH resin composition (F), a high-temperature yellowing property test was conducted in the procedure described previously, resulting in a B rating. Moreover, using the dry EVOH pellets, a odor test was conducted in the procedure described previously. None of the five monitors perceived a smell and therefore an A rating was provided.

Furthermore, using the above-mentioned pellets of the dry EVOH resin composition (F), an adhesive strength test was conducted in the procedure described previously. The adhesive strength immediately after the film formation was 550 g/15 mm and that after a lapse of one week since the film formation was 800 g/15 mm. In both measurements, favorable adhesive strengths were obtained.

Referential Examples 2 to 6

Preparations of pellets of dry EVOH resin compositions (F) were conducted in the same manner as that in Referential Example 1 except changing, as summarized in Table 1, the composition of the carbon dioxide gas-containing treatment solution in which water-containing EVOH pellets after immersion in an aqueous boric acid solution were immersed. Then, evaluations were also conducted in the same manner as that in Referential Example 1. The compositions of the pellets of the dry EVOH resin compositions (F) and their evaluations are shown in Table 2, and Table 3, respectively.

Referential Example 7

Into a saponification reactor having a capacity of 470 L, 50 kg of a 45% methanol solution of an ethylene-vinyl acetate copolymer having an ethylene content of 44 mol % and 129 kg of methanol were charged and the internal temperature was adjusted to 60° C. while nitrogen gas is blown into the reactor. 29 L of a sodium hydroxide solution (concentration: 80 g/L) in methanol was added thereto and saponification reaction was started. During the saponification reaction, nitrogen gas was blown continuously into the reactor in order to exhaust methyl acetate formed in the reaction system as a by-product out of the reaction system together with the methanol in the reaction system for the purpose of improving the reaction efficiency. The exhaustion rate was about 20 kg/hr in total of methyl acetate and methanol. The exhaust was condensed in a cooling condenser to be recovered. After a lapse of two hours since the start of the reaction, 29 L of a sodium hydroxide solution (concentration: 80 g/L) in methanol was further added to finish up the saponification reaction. After a lapse of six hours since the reaction was started, 6.8 kg of acetic acid and 45 L of water were added to neutralize the reaction solution, thereby stopping the reaction.

The reaction solution neutralized was transferred from the reactor into a drum. It was left stand at room temperature for 16 hours to be cooled and solidified into cake form. Then, the cake-form resin was dewatered by use of a centrifuge (H-130 manufactured by KOKUSAN Corporation, rotation speed 1200 rpm). Subsequently, a step of washing the resin with water by continuously supplying ion exchange water to the central portion of the centrifuge from above and simultaneously dewatering was done for 10 hours. The wash obtained after a lapse of 10 hours since the beginning of the washing had a conductivity of 30 μS/cm (measured by CM-30ET manufactured by DKK-TOA Corporation).

The granular EVOH obtained in this way was dried at 60° C. for 48 hours using a drier. 20 kg of the dried granular EVOH was dissolved in 48 L of water/methanol mixed solution (weight ratio: water/methanol=2/8) at 80° C. for 12 hours under stirring. Then, the stirring was stopped and the temperature in the dissolution vessel was dropped to 65° C. By leaving for five hours, the EVOH solution in water/methanol was degassed. The solution was extruded into a water/methanol mixed solution (weight ratio: water/methanol=9/1) at 5° C. through a metal plate having a circular opening of 3.5 mm in diameter to form a strand-like solid, which was cut to yield pellets of about 4 mm in diameter and about 5 mm in length.

An operation composed of charging 2.4 kg of the thus obtained hydrous pellets and 24 L of ion exchange water in a plastic container having a height of 400 mm and an opening diameter of 370 mm, washing at 25° C. for two hours while stirring, and then dewatering was repeated twice. Then, an operation composed of adding 24 L of a 1 g/L aqueous acetic acid solution to 2.4 kg of the hydrous pellets, washing at 25° C. for two hours while stirring and then dewatering was repeated twice. Moreover, an operation composed of adding 24 L of ion exchange water to 2.4 kg of the hydrous pellets, washing at 25° C. for two hours while stirring and then dewatering was repeated six times. The wash obtained after the sixth washing was measured for its conductivity using a CM-30ET manufactured by DKK-TOA Corporation. As a result, the wash had a conductivity of 3 µS/cm. The water content of the resulting EVOH pellets was 50% by weight.

Into a plastic container having a height of 300 mm and an opening diameter of 280 mm, 2.4 kg of the thus obtained water-containing pellets of washed EVOH (ethylene content: 44 mol %, degree of saponification: 99.98 mol % or more (calculated by NMR), intrinsic viscosity: 0.088 L/g) and 5.1 L of an aqueous boric acid solution having a concentration of 0.51 g/L were charged. Then, immersion was done at 25° C. for 10 hours and thereafter the pellets were dewatered.

Next, 24 L of ion exchange water was charged into a plastic container having a height of 400 mm and an opening diameter of 370 mm. A silicone tube (inner diameter: 7 mm; outer diameter: 10 mm) was inserted into the ion exchange water contained in the container and carbon dioxide gas was blown thereinto for 2 hours by bubbling at a rate of 5 L/min, wherein five silicone tubes were used. The carbon dioxide gas was fed by use of a carbon dioxide gas cylinder (30 kg of liquefied carbon dioxide gas manufactured by Nippon Tansan Co., Ltd.) and a flow meter (Model RK-1600R manufactured by Kojima Instruments Inc.). In the water into which carbon dioxide gas was blown, 2.88 g of boric acid, 4.08 g of potassium hydrogencarbonate and 6.17 g of potassium dihydrogenphosphate were dissolved and blowing of carbon dioxide gas was continued for another one hour at a rate of 5 L/min. The treatment solution had a boric acid content of 0.12 g/L, and a potassium hydrogencarbonate of 0.17 g/L, and a potassium dihydrogenphosphate of 0.257 g/L. The pH of the treatment solution after a 1-hour blowing of carbon dioxide gas was measured using a pH meter (MA235 manufactured by METTLER). The treatment solution had a pH of 5.1.

While the blowing of carbon dioxide gas at a blowing rate of 5 L/min was continued, 2.4 kg of the hydrous pellets were charged into the treatment solution and were subjected to immersion and stirring at 25° C. for six hours. During the period ranging from the beginning of the treatment to the end of the treatment, the pH of the treatment solution was measured at every one-hour interval. The pH of the treatment solution was kept at 5.1 at all measurements with no fluctuations. The carbon dioxide gas concentration in the treatment solution was analyzed to be 20 mmol/L. After a 6-hour immersion and stirring in the treatment solution followed by stirring, the resulting pellets were dewatered immediately and then were subjected to hot-air drying at 80° C. for three hours and successively at 107° C. for 24 hours, yielding pellets of a dry EVOH resin composition (F) (water content: 0.2% by weight).

The alkali metal salt (A) contained in the resulting pellets of the dry EVOH resin composition (F) was potassium and the content of the alkali metal salt (A) was 5.4 µmol/g in terms of metal element. The content (d1) of the phosphoric acid compound (D) was 0.5 µmol/g in terms of phosphate group. The content of a boron compound (B) in the resulting pellets of the dry EVOH resin composition (F) was 242 ppm (22 µmol/g) in terms of boron element. The amount of the carboxylate group (C1) extracted through an immersion treatment of the pellets of the dry EVOH resin composition (F) in water at 95° C. for 10 hours was 0 ppm (0 µmol/g). The amount of the carboxylate (acetate) group (C2) extracted through an immersion treatment in a 0.05 N aqueous sodium hydroxide solution at 95° C. for 10 hours was 36 ppm (0.6 µmol/g). The MFR of the pellets of the dry EVOH resin composition (F) was 1.6 g/10 min (at 190° C. under a load of 2160 g).

Using the resulting pellets of the dry EVOH resin composition (F), a monolayer film was prepared and then tests of yellowing resistance and long-run workability were conducted in the procedures described previously. The yellowing resistance, 72-hour long-run workability and 120-hour long-run workability of the EVOH resin composition (F) of this referential example were all evaluated as being A. The monolayer film had a content (d2) of the phosphoric acid compound (D) of 0.03 µmol/g in terms of phosphate group and a phosphorus element content (t) of 0.5 µmol/g. In addition, the content of organophosphorus compounds extractable in chloroform was less than 0.01 µmol/g.

Using the resulting pellets of the dry EVOH resin composition (F), a high-temperature yellowing property evaluation test was conducted in the procedure described previously, resulting in an A rating. Moreover, using the resulting dry EVOH pellets, an odor test was conducted in the procedure described previously. None of the five monitors perceived a smell and therefore an A rating was provided.

Furthermore, using the resulting pellets of the dry EVOH resin composition (F), an adhesive strength test was conducted in the procedure described previously. The adhesive strength immediately after the film formation was 760 g/15 mm and that after a lapse of one week since the film formation was 880 g/15 mm. In both measurements, favorable adhesive strengths were obtained.

Referential Example 8

Into a saponification reactor having a capacity of 470 L, 50 kg of a 45% methanol solution of an ethylene-vinyl acetate copolymer having an ethylene content of 47 mol % and 129 kg of methanol were charged and the internal temperature was adjusted to 60° C. while nitrogen gas is blown into the reactor. 29 L of a sodium hydroxide solution (concentration: 80 g/L) in methanol was added thereto and saponification reaction was started. During the saponification reaction, nitrogen gas was blown continuously into the reactor in order to exhaust methyl acetate formed in the reaction system as a by-product out of the reaction system together with the methanol in the reaction system for the purpose of improving the reaction efficiency. The exhaustion rate was about 20 kg/hr in total of methyl acetate and methanol. The exhaust was condensed in a cooling condenser to be recovered. After a lapse of two hours since the start of the reaction, 29 L of a sodium hydroxide solution (concentration: 80 g/L) in methanol was further added to finish up the saponification reaction. After a lapse of six hours since the reaction was started, 6.8 kg of acetic acid and 45 L of water were added to neutralize the reaction solution, thereby stopping the reaction.

The reaction solution neutralized was transferred from the reactor into a drum. It was left stand at room temperature for 16 hours to be cooled and solidified into cake form. Then, the cake-form resin was dewatered by use of a centrifuge (H-130 manufactured by KOKUSAN Corporation, rotation speed 1200 rpm). Subsequently, a step of washing the resin with water by continuously supplying ion exchange water to the central portion of the centrifuge from above and simultaneously dewatering was done for 10 hours. The wash obtained after a lapse of 10 hours since the beginning of the washing had a conductivity of 30 μS/cm (measured by CM-30ET manufactured by DKK-TOA Corporation).

The granular EVOH obtained in this way was dried at 60° C. for 48 hours using a drier. 20 kg of the dried granular EVOH was dissolved in 43 L of water/methanol mixed solution (weight ratio: water/methanol=2/8) at 80° C. for 12 hours under stirring. Then, the stirring was stopped and the temperature in the dissolution vessel was dropped to 65° C. By leaving for five hours, the EVOH solution in water/methanol was degassed. The solution was extruded into a water/methanol mixed solution (weight ratio: water/methanol=9/1) at 5° C. through a metal plate having a circular opening of 3.5 mm in diameter to form a strand-like solid, which was cut to yield pellets of about 4 mm in diameter and about 5 mm in length.

An operation composed of charging 2.4 kg of the thus obtained hydrous pellets and 24 L of ion exchange water in a plastic container having a height of 400 mm and an opening diameter of 370 mm, washing at 25° C. for two hours while stirring, and then dewatering was repeated twice. Then, an operation composed of adding 24 L of a 1 g/L aqueous acetic acid solution to 2.4 kg of the hydrous pellets, washing at 25° C. for two hours while stirring and then dewatering was repeated twice. Moreover, an operation composed of adding 24L of ion exchange water to 2.4 kg of the hydrous pellets, washing at 25° C. for two hours while stirring and then dewatering was repeated six times. The wash obtained after the sixth washing was measured for its conductivity using a CM-30ET manufactured by DKK-TOA Corporation. As a result, the wash had a conductivity of 3 μS/cm. The water content of the resulting EVOH pellets was 50% by weight.

Into a plastic container having a height of 300 mm and an opening diameter of 280 mm, 2.4 kg of the thus obtained hydrous pellets of washed EVOH (ethylene content: 47 mol %, degree of saponification: 99.98 mol % or more (calculated by NMR), intrinsic viscosity: 0.082 L/g) and 5 L of an aqueous boric acid solution having a concentration of 0.21 g/L were charged. Then, immersion was done at 25° C. for 10 hours and thereafter the pellets were dewatered.

Next, 5 L of ion exchange water was charged into a plastic container having a height of 300 mm and an opening diameter of 280 mm. A silicone tube (inner diameter: 7 mm; outer diameter: 10 mm) was inserted into the ion exchange water contained in the container and carbon dioxide gas was blown thereinto for 0.5 hours by bubbling at a rate of 1 L/min. The carbon dioxide gas was fed by use of a carbon dioxide gas cylinder (30 kg of liquefied carbon dioxide gas manufactured by Nippon Tansan Co. Ltd.) and a flow meter (Model RK-1600R manufactured by Kojima Instruments Inc.). In the water into which carbon dioxide gas was blown, 0.20 g of boric acid, 1.15 g of potassium hydrogencarbonate and 0.55 g of potassium dihydrogenphosphate were dissolved and blowing of carbon dioxide gas was continued for another one hour at a rate of 1 L/min. The treatment solution had a boric acid content of 0.04 g/L, a potassium hydrogencarbonate content of 0.23 g/L, and a potassium dihydrogenphosphate content of 0.11 g/L. The pH of the treatment solution after a 1-hour blowing of carbon dioxide gas was measured using a pH meter (MA235 manufactured by METTLER). The treatment solution had a pH of 5.2.

While the blowing of carbon dioxide gas at a blowing rate of 1 L/min was continued, 2.4 kg of the hydrous pellets were charged into the treatment solution and were subjected to immersion and stirring at 25° C. for six hours. During the period ranging from the beginning of the treatment to the end of the treatment, the pH of the treatment solution was measured at every one-hour interval. The pH of the treatment solution was kept at 5.2 at all measurements with no fluctuations. The carbon dioxide gas concentration in the treatment solution was analyzed to be 20 mmol/L. After a 6-hour immersion and stirring in the treatment solution followed by stirring, the resulting pellets were dewatered immediately and then were subjected to hot-air drying at 80° C. for three hours and successively at 107° C. for 24 hours, yielding pellets of a dry EVOH resin composition (F) (water content: 0.2% by weight).

The alkali metal salt (A) contained in the resulting pellets of the dry EVOH resin composition (F) was potassium and the content of the alkali metal salt (A) was 5.6 μmol/g in terms of metal element. The content (d1) of phosphoric acid compound (D) was 0.5 μmol/g in terms of phosphate group. The content of a boron compound (B) in the resulting pellets of the dry EVOH resin composition (F) was 110 ppm (10 μmol/g) in terms of boron element. The amount of the carboxylate group (C1) extracted through an immersion treatment of the pellets of the dry EVOH resin composition (F) in water at 95° C. for 10 hours was 0 ppm (0 μmol/g). The amount of the carboxylate (acetate) group (C2) extracted through an immersion treatment in a 0.05 N aqueous sodium hydroxide solution at 95° C. for 10 hours was 35 ppm (0.6 μmol/g). The MFR of the pellets of the dry EVOH resin composition (F) was 6.2 g/10 min (at 190° C. under a load of 2160 g).

Using the resulting pellets of the dry EVOH resin composition (F), a monolayer film was prepared and then tests of yellowing resistance and long-run workability were conducted in the procedures described previously. The yellowing resistance, 72-hour long-run workability and 120-hour long-run workability of the EVOH resin composition (F) of this referential example were all evaluated as being A. The monolayer film had a content (d2) of the phosphoric acid compound (D) of 0.03 μmol/g in terms of phosphate group and a phosphorus element content (t) of 0.5 μmol/g. The content of the organophosphorus compound extractable in chloroform was less than 0.01 μmol/g.

Using the resulting pellets of the dry EVOH resin composition (F), a high-temperature yellowing property evaluation test was conducted in the procedure described previously, resulting in an A rating. Moreover, using the dry EVOH pellets, an odor test was conducted in the procedure described previously. None of the five monitors perceived a smell and therefore an A rating was provided.

Furthermore, using the resulting pellets of the dry EVOH resin composition (F), an adhesive strength test was conducted in the procedure described previously. The adhesive strength immediately after the film formation was 700 g/15 mm and that after a lapse of one week since the film formation was 880 g/15 mm. In both measurements, favorable adhesive strengths were obtained.

Referential Example 9

Into a plastic container having a height of 300 mm and an opening diameter of 280 mm, 2.4 kg of the hydrous pellets obtained in the same manner as that in Referential Example 1 and 5.1 L of an aqueous boric acid solution having a concentration of 0.36 g/L were charged. Then, immersion was done at 25° C. for 10 hours and thereafter the pellets were dewatered.

Subsequently, the hydrous pellets resulting from the dewatering were immersed and stirred in 5.1 L of an aqueous solution containing 0.56 g/L of acetic acid and 0.025 g/L of sodium acetate at 25° C. for six hours. Thereafter the pellets were dewatered and then were subjected to hot-air drying at 80° C. for three hours and successively at 107° C. for 24 hours, yielding dry EVOH resin composition pellets (water content: 0.2% by weight). Using the dry pellets obtained, evaluations were conducted in the same manners as those in Referential Example 1. The compositions of the dry EVOH resin compositions and their evaluations are shown in Table 2, and Table 3, respectively.

Reference Example 10

Dry EVOH resin composition pellets were prepared in the same manner as that in Referential Example 9 except changing, as shown in Table 1, the composition of the treatment solution in which the hydrous pellets resulting from the washing are immersed. Using the dry pellets obtained, evaluations were conducted in the same manners as those in Referential Example 1. The compositions of the dry EVOH resin compositions and their evaluations are shown in Table 2, and Table 3, respectively.

Reference Example 11

Hydrous EVOH pellets (water content 50% by weight) which had an ethylene content of 32 mol %, a degree of saponification of 99.6 mol % (calculated by NMR) and an intrinsic viscosity of 0.085 L/g and which contained a saponification catalyst residue were washed in the same manner as that in Referential Example 9.

Dry EVOH resin composition pellets were prepared in the same manner as that in Referential Example 9 except using, as hydrous pellets, those prepared above and changing, as shown in Table 1, the composition of the solution in which the hydrous pellets obtained are immersed. Using the dry pellets obtained, evaluations were conducted in the same manners as those in Referential Example 1. The compositions of the dry EVOH resin compositions and their evaluations are shown in Table 2, and Table 3, respectively.

Reference Example 12

Dry EVOH resin composition pellets were prepared in the same manner as that in Referential Example 9 except changing, as shown in Table 1, the composition of the treatment solution in which the hydrous pellets resulting from the washing are immersed. Using the dry pellets obtained, evaluations were conducted in the same manners as those in Referential Example 1. The compositions of the dry EVOH resin compositions and their evaluations are shown in Table 2, and Table 3, respectively.

TABLE 1

| | Prescription of Treatment Solution | | | | | | | | | |
|---|---|---|---|---|---|---|---|---|---|---|
| | Blowing of carbon dioxide gas | Acetic acid (g/L) | Sodium carbonate (g/L) | Potassium carbonate (g/L) | Potassium hydrogen-carbonate (g/L) | Dipotassium hydrogen-phosphate (g/L) | Potassium dihydrogen-phosphate (g/L) | Phosphoric acid (g/L) | Sodium acetate (g/L) | Boric acid ($H_3BO_3$) (g/L) | pH |
| Example 1 | Yes | 0 | 0 | 0 | 0 | 0.270 | 0 | 0.050 | 0 | 0.07 | 4.9 |
| Example 2 | Yes | 0 | 0 | 0 | 0.130 | 0 | 0.170 | 0 | 0 | 0.07 | 5.0 |
| Example 3 | Yes | 0 | 0 | 0 | 0 | 0.270 | 0 | 0.050 | 0 | 0.07 | 4.9 |
| Referential Example 1 | Yes | 0 | 0.110 | 0 | 0 | 0 | 0 | 0 | 0 | 0.10 | 5.1 |
| Referential Example 2 | Yes | 0 | 0 | 0.140 | 0 | 0 | 0 | 0 | 0 | 0.10 | 4.7 |
| Referential Example 3 | Yes | 0 | 0.016 | 0 | 0 | 0 | 0 | 0 | 0 | 0.10 | 4.7 |
| Referential Example 4 | Yes | 0 | 0 | 0.020 | 0 | 0 | 0 | 0 | 0 | 0.10 | 4.2 |
| Referential Example 5 | Yes | 0 | 0.240 | 0 | 0 | 0 | 0 | 0 | 0 | 0.10 | 5.4 |
| Referential Example 6 | Yes | 0 | 0 | 0.310 | 0 | 0 | 0 | 0 | 0 | 0.10 | 5.3 |
| Referential Example 7 | Yes | 0 | 0 | 0 | 0.170 | 0 | 0.257 | 0 | 0 | 0.12 | 5.1 |
| Referential Example 8 | Yes | 0 | 0 | 0 | 0.230 | 0 | 0.110 | 0 | 0 | 0.04 | 5.2 |
| Referential Example 9 | No | 0.560 | 0 | 0 | 0 | 0 | 0 | 0 | 0.025 | 0.10 | Not measured |
| Referential Example 10 | No | 0.560 | 0 | 0 | 0 | 0 | 0 | 0 | 0.700 | 0.10 | Not measured |
| Referential Example 11 | No | 0.200 | 0 | 0 | 0 | 0 | 0 | 0 | 0.800 | 0.10 | Not measured |
| Referential Example 12 | No | 0.500 | 0 | 0 | 0 | 0.270 | 0 | 0.050 | 0 | 0.07 | Not measured |

TABLE 2

Constitution of EVOH resin composition

| | EVOH | | Alkali metal salt (a: sodium) (μmol/g) | Alkali metal salt (a: potassium) (μmol/g) | Boron compound (B) (μmol/g) | Carboxylate group (C1) (μmol/g) | Carboxylate group (C2) (μmol/g) | Analysis results of pellets before melt-molding | | | Analysis results of monolayer film | | |
|---|---|---|---|---|---|---|---|---|---|---|---|---|---|
| | Ethylene content (ET) (mol %) | Degree of saponification (mol %) | | | | | | Phosphoric acid compound (d1) (μmol/g) | Ratio a/d1 | | Phosphoric acid compound (d2) (μmol/g) | Phosphorus element content (t) (μmol/g) | Ratio d2/t |
| Example 1 | 32 | 99.98 or more | 0 | 3.4 | 13 | 0 | 0.6 | 1.2 | 2.8 | | 0.10 | 1.2 | 0.08 |
| Example 2 | 27 | 99.98 or more | 0 | 2.6 | 15 | 0 | 0.6 | 0.4 | 6.5 | | 0.02 | 0.4 | 0.05 |
| Example 3 | 32 | 99.98 or more | 0 | 3.4 | 13 | 0 | 0.6 | 1.2 | 2.8 | | 0.10 | 1.2 | 0.08 |
| Referential Example 1 | 32 | 99.98 or more | 3.1 | 0 | 15 | 0 | 0.6 | 0 | — | | — | — | — |
| Referential Example 2 | 32 | 99.98 or more | 0 | 3.0 | 15 | 0 | 0.6 | 0 | — | | — | — | — |
| Referential Example 3 | 32 | 99.98 or more | 0.6 | 0 | 15 | 0 | 0.6 | 0 | — | | — | — | — |
| Referential Example 4 | 32 | 99.98 or more | 0 | 0.5 | 15 | 0 | 0.6 | 0 | — | | — | — | — |
| Referential Example 5 | 32 | 99.98 or more | 6.0 | 0 | 15 | 0 | 0.6 | 0 | — | | — | — | — |
| Referential Example 6 | 32 | 99.98 or more | 0 | 5.8 | 15 | 0 | 0.6 | 0 | — | | — | — | — |
| Referential Example 7 | 44 | 99.98 or more | 0 | 5.4 | 22 | 0 | 0.6 | 0.5 | 10.8 | | 0.03 | 0.5 | 0.06 |
| Referential Example 8 | 47 | 99.98 or more | 0 | 5.6 | 10 | 0 | 0.6 | 0.5 | 11.2 | | 0.03 | 0.5 | 0.06 |
| Referential Example 9 | 32 | 99.98 or more | 0.3 | 0 | 15 | 6.8 | 7.6 | 0 | — | | — | — | — |
| Referential Example 10 | 32 | 99.98 or more | 5.8 | 0 | 15 | 6.9 | 7.7 | 0 | — | | — | — | — |
| Referential Example 11 | 32 | 99.6 | 8.0 | 0 | 15 | 9.0 | 60.9 | 0 | — | | — | — | — |
| Referential Example 12 | 32 | 99.98 or more | 0 | 3.1 | 13 | 6.9 | 7.7 | 1.0 | 3.1 | | 0.95 | 1.0 | 0.95 |

TABLE 3

Evaluations

| | Interlayer adhesion strength (g/15 mm) | | Monolayer film formation test | | | | |
|---|---|---|---|---|---|---|---|
| | Just after film formation | After one week | Yellowing resistance | Long-run workability (72 hr) | Long-run workability (120 hr) | High-temperature yellowing | Odor |
| Example 1 | 760 | 900 | A | A | A | A | A |
| Example 2 | 800 | 950 | B | A | B | B | A |
| Example 3 | 760 | 900 | A | A | A | A | A |
| Referential Example 1 | 550 | 800 | A | A | A | B | A |
| Referential Example 2 | 675 | 870 | A | A | A | B | A |
| Referential Example 3 | 240 | 565 | A | A | B | B | A |
| Referential Example 4 | 280 | 650 | A | A | A | B | A |
| Referential Example 5 | 500 | 730 | A | A | B | B | A |
| Referential Example 6 | 750 | 890 | A | A | A | B | A |
| Referential Example 7 | 760 | 880 | A | A | A | A | A |
| Referential Example 8 | 700 | 880 | A | A | A | A | A |
| Referential Example 9 | 100 | 355 | A | D | D | B | C |

TABLE 3-continued

| | Evaluations | | | | | | |
|---|---|---|---|---|---|---|---|
| | Interlayer adhesion strength (g/15 mm) | | Monolayer film formation test | | | | |
| | Just after film formation | After one week | Yellowing resistance | Long-run workability (72 hr) | Long-run workability (120 hr) | High-temperature yellowing | Odor |
| Referential Example 10 | 480 | 760 | A | B | C | B | C |
| Referential Example 11 | 440 | 725 | A | C | D | C | C |
| Referential Example 12 | 450 | 760 | A | C | D | A | C |

In Examples 1 to 3 and Referential Examples 7 and 8, EVOHs varying in ethylene content from 27 mol % to 47 mol % were used. Our past experiences have revealed that it is preferable that the content of an alkali metal content (A) get greater with increase of the ethylene content. Regarding the contents of the alkali metals (A) in Examples 1 to 3 and Referential Examples 7 and 8, an alkali metal salt (A) was incorporated in an amount which seemed to be optimum for each ethylene content based on such knowledge.

FIG. 1 is a graph showing the relation between the ethylene content (ET) and the content (a) of alkali metal salt (A) in Examples 1 to 3 and Referential Examples 7 and 8. An approximate curve was obtained by exponential approximation from the four data plotted. Thus, an approximate formula "a=0.95×exp (0.039×ET)" was obtained. It is desirable to use an alkali metal salt (A) within the range of ±2 µmol/g relative to the formula.

What is claimed is:

1. A resin composition comprising:
an unmodified ethylene-vinyl alcohol copolymer resin composition (F):
containing 0.1 to 20 µmol/g, in terms of alkali metal, of an alkali metal salt (A);
yielding 0 to 2 µmol/g of a carboxylate group (C1) upon extraction by immersion treatment in water at 95° C. for 10 hours; and
yielding 0 to 40 µmol/g of a carboxylate group (C2) upon extraction by immersion treatment in a 0.05 N aqueous sodium hydroxide solution at 95° C. for 10 hours; and
a thermoplastic resin (G) comprising at least one resin selected from the group consisting of polyolefin (G1), polyamide (G2) and a modified ethylene-vinyl alcohol copolymer (G3) having an ethylene content of 5 to 55 mol % and containing 0.3 to 40 mol % of the following structural unit (I):

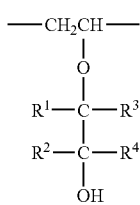

(I)

wherein $R^1$, $R^2$, $R^3$ and $R^4$ each denote a hydrogen atom, an aliphatic hydrocarbon group having 1 to 10 carbon atoms, an alicyclic hydrocarbon group having 3 to 10 carbon atoms or an aromatic hydrocarbon group having 6 to 10 carbon atoms; $R^1$, $R^2$, $R^3$ and $R^4$ may be the same or different; $R^3$ and $R^4$ may be combined together; and $R^1$, $R^2$, $R^3$ and $R^4$ each may have a hydroxyl group, a carboxyl group or a halogen atom.

2. The resin composition according to claim 1 which comprises 0.1 to 99.9% by weight of the unmodified ethylene-vinyl alcohol copolymer resin composition (F) and 0.1 to 99.9% by weight of the polyolefin (G1).

3. The resin composition according to claim 1 which comprises 1 to 99% by weight of the unmodified ethylene-vinyl alcohol copolymer resin composition (F) and 1 to 99% by weight of the polyamide (G2).

4. The resin composition according to claim 3, wherein the polyamide (G2) has terminal amino groups in an amount of 15 µmol/g of less.

5. The resin composition according to claim 1 which comprises 1 to 99% by weight of the unmodified ethylene-vinyl alcohol copolymer resin composition (F) and 1 to 99% by weight of the modified ethylene-vinyl alcohol copolymer (G3).

6. The resin composition according to claim 1, wherein the alkali metal salt (A) is a potassium salt.

7. The resin composition according to claim 1, wherein the unmodified ethylene-vinyl alcohol copolymer resin composition (F) further contains 1 to 200 µmol/g, in terms of boron element, of a boron compound (B).

8. The resin composition according to claim 1, wherein a phosphorus element content (t) of the unmodified ethylene-vinyl alcohol copolymer resin composition (F) is 0.05 to 5 µmol/g.

9. A molded article obtained by molding the resin composition according to claim 1.

10. A resin composition comprising:
an unmodified ethylene-vinyl alcohol copolymer resin composition (F):
containing 0.1 to 20 µmol/g, in terms of alkali metal, of an alkali metal salt (A);
yielding 0 to 2 µmol/g of a carboxylate group (C1) upon extraction by immersion treatment in water at 95° C. for 10 hours; and
having a degree of saponification of 99.7 to 100 mol %; and
a thermoplastic resin (G) comprising at least one resin selected from the group consisting of polyolefin (G1), polyamide (G2) and a modified ethylene-vinyl alcohol copolymer (G3) having an ethylene content of 5 to 55 mol % and containing 0.3 to 40 mol % of the following structural unit (I):

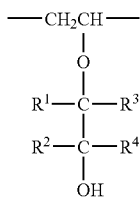

wherein $R^1$, $R^2$, $R^3$ and $R^4$ each denote a hydrogen atom, an aliphatic hydrocarbon group having 1 to 10 carbon atoms, an alicyclic hydrocarbon group having 3 to 10 carbon atoms or an aromatic hydrocarbon group having 6 to 10 carbon atoms; $R^1$, $R^2$, $R^3$ and $R^4$ may be the same or different; $R^3$ and $R^4$ may be combined together; and $R^1$, $R^2$, $R^3$ and $R^4$ each may have a hydroxyl group, a carboxyl group or a halogen atom.

11. The resin composition according to claim 10 which comprises 0.1 to 99.9% by weight of the unmodified ethylene-vinyl alcohol copolymer resin composition (F) and 0.1 to 99.9% by weight of the polyolefin (G1).

12. The resin composition according to claim 10 which comprises 1 to 99% by weight of the unmodified ethylene-vinyl alcohol copolymer resin composition (F) and 1 to 99% by weight of the polyamide (G2).

13. The resin composition according to claim 12, wherein the polyamide (G2) has terminal amino groups in an amount of 15 μmol/g or less.

14. The resin composition according to claim 10 which comprises 1 to 99% by weight of the unmodified ethylene-vinyl alcohol copolymer resin composition (F) and 1 to 99% by weight of the modified ethylene-vinyl alcohol copolymer (G3).

15. The resin composition according to claim 10, wherein the alkali metal salt (A) is a potassium salt.

16. The resin composition according to claim 10, wherein the unmodified ethylene-vinyl alcohol copolymer resin composition (F) further contains 1 to 200 μmol/g, in terms of boron element, of a boron compound (B).

17. The resin composition according to claim 10, wherein a phosphorus element content (t) of the unmodified ethylene-vinyl alcohol copolymer resin composition (F) is 0.05 to 5 μmol/g.

18. A molded article obtained by molding the resin composition according to claim 10.

19. A method for producing a resin composition, wherein an unmodified ethylene-vinyl alcohol copolymer is contacted with an aqueous solution containing both carbon dioxide gas and at least one additive selected from the group consisting of an alkali metal salt (A) and a boron compound (B) and then is melt kneaded with a thermoplastic resin (G) comprising at least one resin selected from the group consisting of polyolefin (G1), polyamide (G2) and a modified ethylene-vinyl alcohol copolymer (G3) having an ethylene content of 5 to 55 mol % and containing 0.3 to 40 mol % of the following structural unit (I):

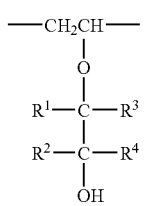

wherein $R^1$, $R^2$, $R^3$ and $R^4$ each denote a hydrogen atom, an aliphatic hydrocarbon group having 1 to 10 carbon atoms, an alicyclic hydrocarbon group having 3 to 10 carbon atoms or an aromatic hydrocarbon group having 6 to 10 carbon atoms; $R^1$, $R^2$, $R^3$ and $R^4$ may be the same or different; $R^3$ and $R^4$ may be combined together; and $R^1$, $R^2$, $R^3$ and $R^4$ each may have a hydroxyl group, a carboxyl group or a halogen atom.

20. The method for producing a resin composition according to claim 19, wherein the thermoplastic resin (G) is polyolefin (G1).

21. The method for producing a resin composition according to claim 19, wherein the thermoplastic resin (G) is polyamide (G2).

22. The method for producing a resin composition according to claim 19, wherein the thermoplastic resin (G) comprises the modified ethylene-vinyl alcohol copolymer (G3).

* * * * *

UNITED STATES PATENT AND TRADEMARK OFFICE
CERTIFICATE OF CORRECTION

PATENT NO. : 7,473,735 B2
APPLICATION NO. : 10/896091
DATED : January 6, 2009
INVENTOR(S) : Uchiumi et al.

Page 1 of 1

It is certified that error appears in the above-identified patent and that said Letters Patent is hereby corrected as shown below:

On the title page, Item (45) should read as follows:

-- (45) **Date of Patent: * Jan. 6, 2009**

(*) Notice: Subject to any disclaimer, the term of this patent is extended or adjusted under 35 U.S.C. 154(b) by 476 days.

This patent is subject to a terminal disclaimer. --

Signed and Sealed this

Seventeenth Day of February, 2009

JOHN DOLL
*Acting Director of the United States Patent and Trademark Office*